(12) United States Patent
Kameda et al.

(10) Patent No.: US 11,807,338 B2
(45) Date of Patent: Nov. 7, 2023

(54) DRIVE UNIT FOR HUMAN-POWERED VEHICLE AND BATTERY HOLDING DEVICE OF HUMAN-POWERED VEHICLE

(71) Applicant: Shimano Inc., Osaka (JP)

(72) Inventors: Tsuyoshi Kameda, Osaka (JP); Shinichiro Noda, Osaka (JP); Kento Mitsuyasu, Osaka (JP); Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 837 days.

(21) Appl. No.: 16/750,583

(22) Filed: Jan. 23, 2020

(65) Prior Publication Data

US 2020/0247501 A1    Aug. 6, 2020

(30) Foreign Application Priority Data

Feb. 1, 2019 (JP) .................. 2019-017459

(51) Int. Cl.
| | | |
|---|---|---|
| *B62M 6/90* | (2010.01) | |
| *B62M 6/60* | (2010.01) | |
| *B62K 19/40* | (2006.01) | |
| *H01M 50/249* | (2021.01) | |
| *H01M 50/244* | (2021.01) | |
| *B60L 50/64* | (2019.01) | |
| *H01M 50/262* | (2021.01) | |

(52) U.S. Cl.
CPC .............. *B62M 6/90* (2013.01); *B60L 50/64* (2019.02); *B62K 19/40* (2013.01); *B62M 6/60* (2013.01); *H01M 50/244* (2021.01); *H01M 50/249* (2021.01); *H01M 50/262* (2021.01)

(58) Field of Classification Search
CPC . B62M 6/90; B62M 6/60; B62M 6/55; B62M 6/40; B62K 19/40; H01M 50/20
See application file for complete search history.

(56) References Cited

U.S. PATENT DOCUMENTS

| | | | | |
|---|---|---|---|---|
| 5,915,493 | A * | 6/1999 | Nakayama | B60L 50/20 180/220 |
| 6,073,717 | A * | 6/2000 | Yamamoto | B62M 6/55 180/220 |
| 6,095,270 | A * | 8/2000 | Ishikawa | B62M 6/55 180/68.5 |
| 8,505,666 | B2 * | 8/2013 | Kyoden | B62K 19/32 180/206.4 |
| 9,199,630 | B2 * | 12/2015 | Gao | B62M 9/123 |
| 9,502,702 | B2 * | 11/2016 | Nishihara | H01M 50/543 |

(Continued)

FOREIGN PATENT DOCUMENTS

| | | |
|---|---|---|
| CN | 101565069 A | 10/2009 |
| CN | 104411576 A | 3/2015 |

(Continued)

*Primary Examiner* — Tony H Winner
*Assistant Examiner* — Michael R Stabley
(74) *Attorney, Agent, or Firm* — Global IP Counselors, LLP

(57) ABSTRACT

A drive unit is configured to be provided to a human-powered vehicle. The drive unit includes a base on which a crankshaft is provided, and a holder mount provided on the base. The holder mount is configured to selectively mount a battery holder, which is configured to hold a battery unit, at a plurality of positions in a predetermined linear direction.

27 Claims, 18 Drawing Sheets

(56) References Cited

U.S. PATENT DOCUMENTS

| | | | |
|---|---|---|---|
| 9,777,774 B2* | 10/2017 | Biechele | B62K 19/34 |
| 10,036,465 B2* | 7/2018 | Watarai | B62K 19/34 |
| 10,239,578 B2* | 3/2019 | Leiber | B62M 6/55 |
| 10,300,985 B2* | 5/2019 | Mano | F16B 5/0233 |
| 10,850,803 B2* | 12/2020 | Durdevic | B62J 11/00 |
| 10,850,804 B1* | 12/2020 | Noda | B62M 17/00 |
| 10,850,805 B1* | 12/2020 | Noda | B62M 6/55 |
| 10,858,066 B2* | 12/2020 | Noda | B62M 6/90 |
| 11,077,914 B2* | 8/2021 | Noda | B62K 19/34 |
| 11,167,817 B2* | 11/2021 | Noda | B62M 6/55 |
| 11,358,677 B2* | 6/2022 | Noda | B62K 19/30 |
| 11,433,970 B2* | 9/2022 | Noda | B62K 19/34 |
| 2009/0261134 A1* | 10/2009 | Tetsuka | B62M 9/132 |
| | | | 224/412 |
| 2015/0210351 A1 | 7/2015 | Tagaya et al. | |
| 2016/0194053 A1* | 7/2016 | Preining | B62K 13/00 |
| | | | 310/91 |
| 2016/0325802 A1* | 11/2016 | Leiber | B62M 15/00 |
| 2017/0137087 A1* | 5/2017 | Watarai | B62M 6/55 |
| 2017/0314593 A1* | 11/2017 | Mano | B62K 11/04 |
| 2018/0251188 A1* | 9/2018 | Durdevic | B62M 6/55 |
| 2018/0269439 A1* | 9/2018 | Yoneda | B62K 19/30 |
| 2019/0002053 A1* | 1/2019 | Kakinoki | B62K 19/40 |
| 2019/0039688 A1* | 2/2019 | Noda | B62M 17/00 |
| 2019/0111998 A1* | 4/2019 | Noda | B62M 6/55 |
| 2019/0111999 A1* | 4/2019 | Noda | B62M 11/02 |
| 2019/0112001 A1* | 4/2019 | Noda | B62M 11/02 |
| 2019/0112003 A1* | 4/2019 | Noda | B62M 6/50 |

FOREIGN PATENT DOCUMENTS

| | | |
|---|---|---|
| CN | 105460157 A | 4/2016 |
| CN | 205931152 U | 2/2017 |
| FR | 3043982 A1 | 5/2017 |
| JP | 8-58671 A | 3/1996 |
| JP | 2001-88769 A | 4/2001 |
| JP | 2006-103474 A | 4/2006 |
| JP | 2015-140071 A | 8/2015 |
| JP | 2018-6144 A | 1/2018 |
| JP | 2018-176839 A | 11/2018 |

* cited by examiner

DRIVE UNIT FOR HUMAN-POWERED VEHICLE AND BATTERY HOLDING DEVICE OF HUMAN-POWERED VEHICLE

CROSS-REFERENCE TO RELATED APPLICATIONS

This application claims priority to Japanese Patent Application No. 2019-017459, filed on Feb. 1, 2019. The entire disclosure of Japanese Patent Application No. 2019-017459 is hereby incorporated herein by reference.

BACKGROUND

Technical Field

The present invention generally relates to a drive unit for a human-powered vehicle and a battery holding device of a human-powered vehicle.

Background Information

Japanese Laid-Open Patent Publication No. 2018-6144 (Patent document 1) discloses an example of a battery unit that is for a human-powered vehicle and is mounted on a frame of the human-powered vehicle.

SUMMARY

One object of the present disclosure is to provide a drive unit for a human-powered vehicle and a battery holding device of a human-powered vehicle that allow the drive unit to be provided close to a battery unit.

A drive unit in accordance with a first aspect of the present disclosure is for a human-powered vehicle. The drive unit comprises a base on which a crankshaft is provided, and a holder mount provided on the base. The holder mount is configured to selectively mount a battery holder, which is configured to hold a battery unit, at a plurality of positions in a predetermined linear direction.

With the drive unit according to the first aspect, the holder mount is included in the drive unit. Thus, the battery unit and the drive unit are provided close to each other. With the drive unit according to the first aspect, the holder mount is configured to selectively mount the battery holder at a plurality of positions in the predetermined linear direction. Thus, the battery unit is provided at an appropriate position in the predetermined linear direction in accordance with dimensional tolerances of the battery unit and the type of the battery unit.

In accordance with a second aspect of the present disclosure, the drive unit according to the first aspect is configured so that the holder mount includes at least one of a male thread, a female thread, and an elongated hole that extends in the predetermined linear direction.

With the drive unit according to the second aspect, at least one of the male thread, the female thread, and the elongated hole is used to appropriately mount the battery holder on the base.

In accordance with a third aspect of the present disclosure, the drive unit according to the first or second aspect further comprises a frame mount provided on the base and configured to be mounted on a frame of the human-powered vehicle. The holder mount and the frame mount are located at different positions as viewed in a direction in which the crankshaft extends.

With the drive unit according to the third aspect, in a case in which the frame mount is mounted on the frame, interference of the holder mount is limited. Thus, the frame mount allows the drive unit to be appropriately mounted on the frame.

A drive unit in accordance with a fourth aspect of the present disclosure is for a human-powered vehicle. The drive unit comprises a base on which a crankshaft is provided, a holder mount provided on the base, and a frame mount provided on the base. The holder mount is configured to be attachable to and detachable from a battery holder, which is configured to hold a battery unit. The frame mount is configured to be mounted on a frame of the human-powered vehicle. The holder mount and the frame mount are located at different positions as viewed in a direction in which the crankshaft extends.

With the drive unit according to the fourth aspect, the holder mount is included in the drive unit. Thus, the battery unit and the drive unit are provided close to each other. With the drive unit according to the fourth aspect, in a case in which the frame mount is mounted on the frame, interference of the holder mount is limited. Thus, the frame mount allows the drive unit to be appropriately mounted on the frame.

In accordance with a fifth aspect of the present disclosure, the drive unit according to the fourth aspect is configured so that the holder mount includes at least one of a male thread, a female thread, and an elongated hole.

With the drive unit according to the fifth aspect, at least one of the male thread, the female thread, and the elongated hole is used to appropriately mount the battery holder on the base.

In accordance with a sixth aspect of the present disclosure, the drive unit according to the second or fifth aspect is configured so that the holder mount includes the elongated hole and a male threaded fastener having the male thread inserted into the elongated hole.

With the drive unit according to the sixth aspect, the elongated hole and the male threaded fastener are used to mount the battery holder on the base so that the battery holder is movable relative to the drive unit.

In accordance with a seventh aspect of the present disclosure, the drive unit according to any one of the fourth to sixth aspects is configured so that the holder mount is configured to selectively mount the battery holder at a plurality of positions in a predetermined linear direction.

With the drive unit according to the seventh aspect, the holder mount is configured to selectively mount the battery holder at a plurality of positions in the predetermined linear direction. Thus, the battery unit is provided at an appropriate position in the predetermined linear direction in accordance with dimensional tolerances of the battery unit and the type of the battery unit.

In accordance with an eighth aspect of the present disclosure, the drive unit according to any one of the first to third aspects is configured so that the holder mount is configured to be non-movable in the predetermined linear direction.

With the drive unit according to the eighth aspect, the holder mount is stably provided on the base.

In accordance with a ninth aspect of the present disclosure, the drive unit according to any one of the first to third, seventh, and eighth aspects is configured so that the base includes a flat surface parallel to the predetermined linear direction, and the holder mount is provided on the flat surface.

With the drive unit according to the ninth aspect, the holder mount is stably provided on the base.

In accordance with a tenth aspect of the present disclosure, the drive unit according to any one of the first to third and seventh to ninth aspects is configured so that the predetermined linear direction intersects a direction in which the crankshaft extends.

With the drive unit according to the tenth aspect, the holder mount is configured to selectively mount the battery holder at a plurality of positions in a direction intersecting the direction in which the crankshaft extends. Thus, the battery unit is provided at an appropriate position in the direction intersecting the direction in which the crankshaft extends in accordance with dimensional tolerances of the battery unit and the type of the battery unit in the predetermined linear direction.

In accordance with an eleventh aspect of the present disclosure, the drive unit according to the tenth aspect is configured so that the predetermined linear direction is orthogonal to the direction in which the crankshaft extends.

With the drive unit according to the eleventh aspect, the holder mount is configured to selectively mount the battery holder at a plurality of positions in a direction orthogonal to the direction in which the crankshaft extends. Thus, the battery unit is provided at an appropriate position in the direction orthogonal to the direction in which the crankshaft extends in accordance with dimensional tolerances of the battery unit and the type of the battery unit in the predetermined linear direction.

In accordance with a twelfth aspect of the present disclosure, the drive unit according to the tenth or eleventh aspect is configured so that the predetermined linear direction extends in a longitudinal direction of a frame of the human-powered vehicle in a state in which the drive unit is mounted on the frame of the human-powered vehicle.

With the drive unit according to the twelfth aspect, the holder mount is configured to selectively mount the battery holder at a plurality of positions in the longitudinal direction of the frame. Thus, the battery unit is provided at an appropriate position in the longitudinal direction of the frame in accordance with dimensional tolerances of the battery unit and the type of the battery unit.

In accordance with a thirteenth aspect of the present disclosure, the drive unit according to the twelfth aspect is configured so that the predetermined linear direction extends in a direction in which a down tube of the frame of the human-powered vehicle extends.

With the drive unit according to the thirteenth aspect, the holder mount is configured to selectively mount the battery holder at a plurality of positions in the direction in which the down tube extends. Thus, the battery unit is provided at an appropriate position in the direction in which the down tube extends in accordance with dimensional tolerances of the battery unit and the type of the battery unit in the predetermined linear direction.

In accordance with a fourteenth aspect of the present disclosure, the drive unit according to any one of the first to third and seventh aspects is configured so that the predetermined linear direction is parallel to a direction in which the crankshaft extends.

With the drive unit according to the fourteenth aspect, the battery holder is configured to be mounted at a plurality of positions in a direction parallel to the direction in which the crankshaft extends. Thus, the battery unit is provided at an appropriate position in the direction parallel to the direction in which the crankshaft extends in accordance with dimensional tolerances of the battery unit and the type of the battery unit in the predetermined linear direction.

In accordance with a fifteenth aspect of the present disclosure, the drive unit according to any one of the first to thirteenth aspects is configured so that at least part of the holder mount is integral with the base as a one-piece structure.

In the drive unit according to the fifteenth aspect, the number of components is reduced.

In accordance with a sixteenth aspect of the present disclosure, the drive unit according to any one of the first to fifteenth aspects is configured so that the base includes a recess, and at least part of the holder mount is provided in the recess.

In the drive unit according to the sixteenth aspect, the holder mount and the base are readily shaped with an integrated appearance.

In accordance with a seventeenth aspect of the present disclosure, the drive unit according to any one of the first to sixteenth aspects further comprises the battery holder.

With the drive unit according to the seventeenth aspect, the drive unit including the battery holder allows the battery unit to be provided close to the drive unit.

In accordance with an eighteenth aspect of the present disclosure, the drive unit according to the seventeenth aspect is configured so that the battery unit includes a first end and a second end. The second end is spaced from the first end in a longitudinal direction. The battery holder is configured to hold the first end.

With the drive unit according to the eighteenth aspect, the longitudinal first end of the battery unit is appropriately held.

In accordance with a nineteenth aspect of the present disclosure, the drive unit according to the seventeenth or eighteenth aspect is configured so that the battery holder further includes a restriction configured to restrict movement of the battery unit in the predetermined linear direction.

With the drive unit according to the nineteenth aspect, the battery unit is stably mounted on the base.

In accordance with a twentieth aspect of the present disclosure, the drive unit according to any one of the first to nineteenth aspects further comprises a motor provided on the base and configured to apply a propulsion force to the human-powered vehicle.

With the drive unit according to the twentieth aspect, the drive unit including the motor allows the battery unit to be provided close to the drive unit.

A battery holding device in accordance with a twenty-first aspect of the present disclosure is configured to hold a battery unit of a human-powered vehicle. The battery holding device comprises a battery holder configured to be mounted at a plurality of positions in a predetermined linear direction on a drive unit of the human-powered vehicle provided with a crankshaft.

With the battery holding device according to the twenty-first aspect, the battery holder is configured to be mounted on the drive unit. Thus, the battery unit and the drive unit are provided close to each other. With the battery holding device according to the twenty-first aspect, the battery holder is configured to be mounted on the drive unit at a plurality of positions in the predetermined linear direction. Thus, the battery unit is provided at an appropriate position in the predetermined linear direction in accordance with dimensional tolerances of the battery unit and the type of the battery unit.

A battery holding device in accordance with a twenty-second aspect of the present disclosure is configured to hold a battery unit of a human-powered vehicle. The battery holding device comprises a battery holder configured to be attachable to and detachable from a drive unit of the human-powered vehicle. The drive unit includes a frame mount, which is configured to be mounted on a frame of the human-powered vehicle, and a crankshaft. The battery holder is configured to be mounted on the drive unit at a different position from the frame mount as viewed in a direction in which the crankshaft extends.

With the battery holding device according to the twenty-second aspect, the battery holder is configured to be mounted on the drive unit. Thus, the battery unit and the drive unit are provided close to each other. With the drive unit according to the twenty-second aspect, in a case in which the frame mount is mounted on the frame, interference of the holder mount is limited. Thus, the frame mount allows the drive unit to be appropriately mounted on the frame.

In accordance with a twenty-third aspect of the present disclosure, the battery holding device according to the twenty-second aspect is configured so that the battery holder is configured to be selectively mounted on the drive unit, which is provided with the crankshaft, at a plurality of positions in a predetermined linear direction.

With the battery holding device according to the twenty-third aspect, the battery holder is configured to be mounted on the drive unit at a plurality of positions in the predetermined linear direction. Thus, the battery unit is provided at an appropriate position in the predetermined linear direction in accordance with dimensional tolerances of the battery unit and the type of the battery unit.

In accordance with a twenty-fourth aspect of the present disclosure, the battery holding device according to the twenty-first or twenty-third aspect is configured so that the battery holder includes a restriction configured to restrict movement of the battery unit in the predetermined linear direction.

With the battery holding device according to the twenty-fourth aspect, the battery unit is stably mounted on the base.

In accordance with a twenty-fifth aspect of the present disclosure, the battery holding device according to any one of the twenty-first, twenty-third, and twenty-fourth aspects is configured so that the battery holder includes an elongated hole extending in the predetermined linear direction and a male threaded fastener having a male thread inserted into the elongated hole and joined with a female thread a threaded hole of the drive unit.

With the battery holding device according to the twenty-fifth aspect, the elongated hole and the male threaded fastener are used to movably mount the battery holder on the drive unit.

In accordance with a twenty-sixth aspect of the present disclosure, the battery holding device according to any one of the twenty-first to twenty-fifth aspects is configured so that the battery unit includes a first end and a second end in a longitudinal direction, and the battery holder is configured to hold the first end.

With the battery holding device according to the twenty-sixth aspect, the longitudinal first end of the battery unit is appropriately held.

According to the present disclosure, the drive unit for a human-powered vehicle and the battery holding device of a human-powered vehicle allow the drive unit to be provided close to a battery unit.

BRIEF DESCRIPTION OF THE DRAWINGS

Referring now to the attached drawings which form a part of this original disclosure.

In FIG. 20, the electrical connector is not connected to the electrical connector of the battery unit.

In FIG. 21, the electrical connector is not connected to the electrical connector of the battery unit.

DETAILED DESCRIPTION OF EMBODIMENTS DISCLOSURE

Figure 1:
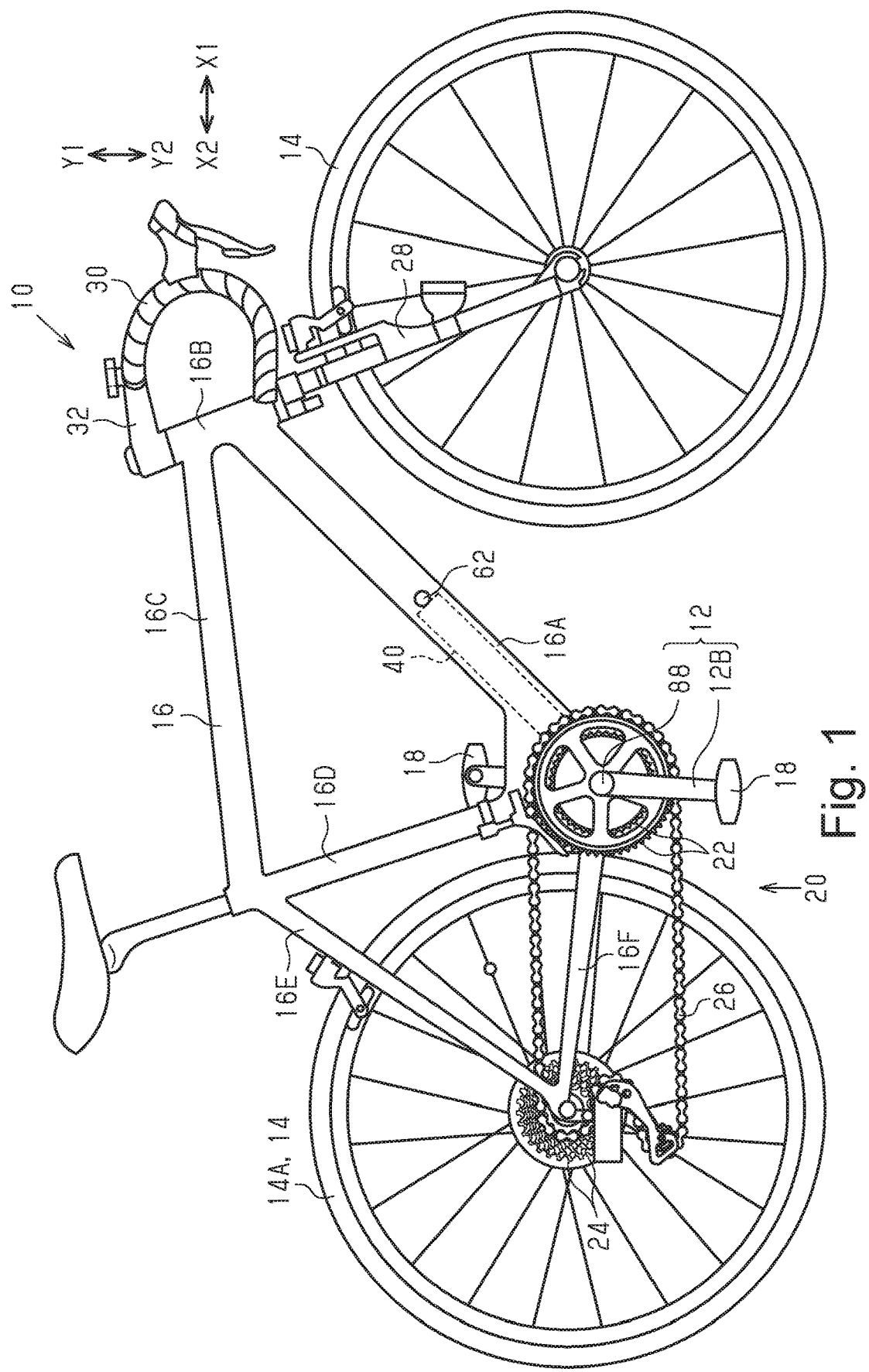
FIG. 1 is a side elevational view of a human-powered vehicle (e.g., a bicycle) including a drive unit and a battery holding device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. In this specification, the phrase "at least one of" as used in this disclosure means "one or more" of a desired choice. In an example, in this specification, the phrase "at least one of" as used in this disclosure means "only one single choice" or "both of two choices" if the number of its choices is two. In another example, in this specification, the phrase "at least one of" as used in this disclosure means "only one single choice" or "any combination of equal to or more than two choices" if the number of its choices is equal to or more than three.

First Embodiment

A first embodiment of a drive unit 80 for a human-powered vehicle and a battery holding device 70 of a human-powered vehicle will now be described with reference to FIGS. 1 to 22. A human-powered vehicle 10 is a vehicle that can be driven by at least human driving force.

The number of wheels on the human-powered vehicle 10 is not limited. The human-powered vehicle 10 includes, for example, a monocycle and a vehicle having three or more wheels. The human-powered vehicle 10 includes, for example, various types of bicycles such as a mountain bike, a road bike, a city bike, a cargo bike, and a recumbent bike and an electric bicycle (E-bike). The electric bicycle includes an electric assist bicycle that assists in propulsion of the vehicle with an electric motor. In the embodiments described below, the human-powered vehicle 10 refers to a bicycle.

The human-powered vehicle 10 includes a crank 12 and a pair of wheels 14.

The wheels 14 include a drive wheel 14A. The human-powered vehicle 10 further includes a frame 16. Human driving force is inputted to the crank 12. The crank 12 includes a crankshaft 88 configured to rotate relative to the frame 16 and a pair of crank arms 12B provided on opposite axial ends of the crankshaft 88. A pedal 18 is coupled to each of the crank arms 12B. The drive wheel 14A is driven in accordance with rotation of the crank 12. The drive wheel 14A is supported by the frame 16. The crank 12 and the drive wheel 14A are coupled by a drive mechanism 20. The drive mechanism 20 includes a first rotary body 22 coupled to the crankshaft 88. The crankshaft 88 and the first rotary body 22 can be coupled via a first one-way clutch. The first one-way clutch is configured to allow forward rotation of the first rotary body 22 in a case in which the crank 12 rotates forward and inhibit rearward rotation of the first rotary body 22 in a case in which the crank 12 rotates rearward. The first one-way clutch can be omitted. In the case of the first one-way clutch being omitted, the crankshaft 88 and the first rotary body 22 integrally rotate together. The first rotary body 22 includes a sprocket, a pulley, or a bevel gear. In the present embodiment, the first rotary body 22 includes a plurality of sprockets. The first rotary body 22 includes, for example, two sprockets. In a case in which the first rotary body 22 includes a plurality of sprockets, a front derailleur is provided on the human-powered vehicle 10. The drive mechanism 20 further includes a second rotation body 24 and a coupling member 26. The coupling member 26 transmits rotational force of the first rotary body 22 to the second rotation body 24. The coupling member 26 includes, for example, a chain, a belt, or a shaft.

The second rotation body 24 is coupled to the drive wheel 14A. The second rotation body 24 includes a sprocket, a pulley, or a bevel gear. Preferably, a second one-way clutch is provided between the second rotation body 24 and the drive wheel 14A. The second one-way clutch is configured to allow forward rotation of the drive wheel 14A in a case in which the second rotation body 24 rotates forward and inhibit rearward rotation of the drive wheel 14A in a case in which the second rotation body 24 rotates rearward. In the present embodiment, the second rotation body 24 includes a plurality of sprockets. The second rotation body 24 includes, for example, seven to thirteen sprockets. In a case in which the second rotation body 24 includes a plurality of sprockets, a rear derailleur is provided on the human-powered vehicle 10.

The wheels 14 include a front wheel and a rear wheel. The front wheel is attached to the frame 16 via a front fork 28. A handlebar 30 is coupled to the front fork 28 via a stem 32. In the embodiments described below, the rear wheel is referred to as the drive wheel 14A. However, the front wheel can be the drive wheel 14A.

The frame 16 of the human-powered vehicle 10 includes a down tube 16A. The frame 16 further includes a head tube 16B, a top tube 16C, a seat tube 16D, a seatstay 16E, and a chainstay 16F.

The human-powered vehicle 10 includes a battery unit 40 for a human-powered vehicle. The battery unit 40 includes one or more battery elements 42. The battery elements 42 include a rechargeable battery. The battery unit 40 supplies electric power to the drive unit 80. Preferably, the battery unit 40 is connected to an electronic controller provided on the drive unit 80 to perform wired or wireless communication with the electronic controller. The battery unit 40 is configured to perform, for example, power line communication (PLC) or controller area network (CAN) with the electronic controller. The battery unit 40 includes an electrical connector 94 configured to be electrically connected to the electronic controller provided on the drive unit 80.

The battery unit 40 is configured to be inserted into the frame 16 of the human-powered vehicle 10 in a longitudinal direction F of the frame 16. The battery unit 40 includes a housing 46 and a third restriction 48. The housing 46 is configured to accommodate the battery elements 42, and extends in the longitudinal direction F of the frame 16. The third restriction 48 is configured to restrict movement of the housing 46 in the longitudinal direction F of the frame 16. The battery unit 40 is configured to be at least partially accommodated in a battery receptacle 16S formed in the down tube 16A. The shape of the housing 46 is not particularly limited as long as the housing 46 has a structure configured to be guided by a guide 86 and held by a battery holder 72. The housing 46 can be, for example, polygonal rod-shaped, cylindrical, or elliptical rod-shaped.

The battery unit 40 is configured to be movable in the battery receptacle 16S in a guide direction G. The battery unit 40 is inserted into the battery receptacle 16S from an opening 16P provided on an end of the down tube 16A connected to the seat tube 16D and the chainstay 16F. The guide direction G includes a first guide direction G1 and a second guide direction G2. The first guide direction G1 is a direction in which the battery unit 40 is moved so that the battery unit 40 is attached to the battery holder 72. The second guide direction G2 is a direction in which the battery unit 40 is moved so that the battery unit 40 is detached from the battery holder 72. The first guide direction G1 extends from the opening 16P toward an end of the down tube 16A connected to the head tube 16B. The second guide direction G2 extends from the end of the down tube 16A connected to the head tube 16B toward the opening 16P.

The human-powered vehicle 10 includes a drive system 60 for a human-powered vehicle. The drive system 60 is configured to hold the battery unit 40. The drive system 60 includes the drive unit 80 for a human-powered vehicle. The drive system 60 further includes a second restriction 62 provided on the frame 16 of the human-powered vehicle 10 to restrict movement of the battery unit 40 together with the drive unit 80. The battery unit 40 includes a first end 40A and a second end 40B in a longitudinal direction B. In a state in which the battery unit 40 is accommodated in the battery receptacle 16S, the longitudinal direction B of the battery unit 40 extends along the down tube 16A, and the first end 40A is provided at the opening 16P of the down tube 16A. The drive unit 80 is configured to hold the first end 40A of the battery unit 40. The second restriction 62 is in contact with the second end 40B and restricts movement of the battery unit 40 in the first guide direction G1. The second restriction 62 is provided on an inner space of the frame 16. The second restriction 62 is provided on the frame 16, for example, to extend through the inner space of the frame 16. In an example, the second restriction 62 is cylindrical. The second restriction 62 can be formed by, for example, a bolt 62A. In this case, the frame 16 includes a through hole 17A through which the bolt 62A extends and a female thread 17B joined with the bolt 62A. In a case in which the frame 16 does not include the female thread 17B, the bolt 62A can extend through the frame 16 and hold the frame 16 with the head of the bolt 62A and a nut so that the bolt 62A is fixed to the frame 16. The second restriction 62 can be configured by a portion of the frame 16.

The drive unit 80 includes a base 82, a frame mount 84, and the guide 86. The crankshaft 88 is provided on the base 82. The frame mount 84 is provided on the base 82 and configured to be mounted on the frame 16 of the human-powered vehicle 10. Preferably, the frame mount 84 is provided on a peripheral portion of the base 82. The frame mount 84 includes a plurality of holes 84A. Bolts 85 are inserted through the holes 84A and coupled to female threads of the frame 16 so that the drive unit 80 is attached to the frame 16. Alternatively, the holes 84A of the frame mount 84 can include female threads, and the bolts 85 can be inserted through holes in the frame 16 and coupled to the female threads of the frame mount 84 so that the drive unit 80 is attached to the frame 16.

Preferably, the drive unit 80 further includes a motor 90 provided on the base 82 and configured to apply a propulsion force to the human-powered vehicle 10. Preferably, the drive unit 80 further includes the crankshaft 88. Preferably, the drive unit 80 further includes an output portion 92. Preferably, the output portion 92 has a rotational center axis that coincides with a rotational center axis C1 of the crankshaft 88. The first rotary body 22 is coupled to an end of the output portion 92. The output portion 92 includes a hollow shaft. The crankshaft 88 is inserted into the hollow shaft of the output portion 92 so that the hollow shaft surrounds a portion of the crankshaft 88. The output portion 92 is supported by a first bearing on the base 82. The crankshaft 88 is supported by a second bearing on the base 82 and supported by a third bearing on the output portion 92. The output portion 92 is coupled to the crankshaft 88. The output portion 92 and the crankshaft 88 can be directly coupled to each other or can be coupled to each other via another member. The output portion 92 and the crankshaft 88 can be coupled, for example, via a one-way clutch.

Preferably, the drive unit 80 further includes a drive circuit of the motor 90 and an electronic controller configured to control the motor 90. The term "electronic controller" as used herein refers to hardware that executes a software program, and does not include a human. Preferably, the drive circuit and the electronic controller are provided on the base 82. The drive circuit can be included in the electronic controller. The drive circuit and the electronic controller are provided on the same circuit board. The electronic controller includes an arithmetic processing device that executes a predetermined control program. The arithmetic processing device includes, for example, a central processing unit (CPU) or a micro processing unit (MPU). The electronic controller can include one or more microcomputers. The electronic controller can further include a data storage device. The data storage device stores information used for various control programs and various control processes. The data storage device is any computer storage device or any non-transitory computer-readable medium with the sole exception of a transitory, propagating signal. The data storage device includes, for example, a nonvolatile memory and a volatile memory and can includes a ROM (Read Only Memory) device, a RAM (Random Access Memory) device, a hard disk, a flash drive, etc. The drive circuit includes an inverter circuit. The drive circuit controls electric power supplied from the battery unit 40 to the motor 90. The drive circuit is connected to the electronic controller to perform wired or wireless communication with the electronic controller. The drive circuit drives the motor 90 in accordance with a control signal from the electronic controller. The motor 90 is configured to apply a propulsion force to the human-powered vehicle 10. The motor 90 includes an electric motor. The motor 90 is provided to transmit rotation to the front wheel or a human driving force power transmission path including the pedals and the rear wheel. In the present embodiment, the motor 90 is configured to transmit rotation to the output portion 92. Preferably, the first one-way clutch is provided on the power transmission path between the motor 90 and the output portion 92 so that in a case in which the crankshaft 88 is rotated in a direction in which the human-powered vehicle 10 travels forward, the motor 90 will not be rotated by the rotational force of the crank 12. Preferably, a speed reducer is provided on the drive unit 80 to reduce speed of rotation produced by the motor 90 and output the rotation.

Preferably, the drive unit 80 further includes a torque sensor. The torque sensor is used to detect human driving force. The torque sensor outputs a signal corresponding to torque of human driving force that is input to the crankshaft 88. Preferably, for example, in a case in which the first one-way clutch is provided on the power transmission path, the torque sensor is provided at an upstream side of the first one-way clutch. The torque sensor includes, for example, a strain sensor or a magnetostrictive sensor. In a case in which the torque sensor includes a strain sensor, the strain sensor is provided, for example, on the output portion 92 or a member provided between the crankshaft 88 and the output portion 92. In a case in which the torque sensor includes a magnetostrictive sensor, a magnetostrictive element is provided on the circumferential surface of the output portion 92 or a member provided between the crankshaft 88 and the output portion 92, and the magnetostrictive sensor is provided around the magnetostrictive element. The torque sensor is configured to communicate with the electronic controller of the motor 90 through a wireless communication device or a wire. The base 82 is configured to include, for example, a housing. In addition, preferably, the housing accommodates a portion of the crankshaft 88, the drive circuit of the motor 90, the electronic controller of the motor 90, the torque sensor, a portion of the motor 90, and the speed reducer.

The guide 86 is provided on the base 82. In a state in which the frame mount 84 is mounted on the frame 16, the guide 86 is configured to guide the battery unit 40 in a guide direction G, which extends along the longitudinal direction F of the frame 16, so that at least part of the battery unit 40 is disposed in the frame 16 of the human-powered vehicle 10. In a state in which the frame mount 84 is mounted on the frame 16, preferably, the guide 86 is configured to guide the battery unit 40 in a guide direction G, which extends along the longitudinal direction F of the frame 16, so that one-half or more of the battery unit 40 is provided in the frame 16 of the human-powered vehicle 10. Preferably, the guide 86 is configured to hamper movement of the battery unit 40 in a direction intersecting the guide direction G.

Preferably, the motor 90 has a rotational center axis C2 that is parallel to the rotational center axis C1 of the crankshaft 88. A first plane P1 includes the rotational center axis C1 of the crankshaft 88 and the rotational center axis C2 of the motor 90. A second plane P2 includes the rotational center axis C1 of the crankshaft 88 and is parallel to the guide direction G. Preferably, an angle DY formed by the first plane P1 and the second plane P2 is greater than or equal to zero degrees and less than or equal to sixty degrees. A first plane P1 includes the rotational center axis C1 of the crankshaft 88 and the rotational center axis C2 of the motor 90. A second plane P2 includes the rotational center axis C1 of the crankshaft 88 and is parallel to the longitudinal direction B of the battery unit 40. Preferably, an angle DX formed by the first plane P1 and the second plane P2 is greater than or equal to zero degrees and less than or equal to sixty degrees.

Preferably, in a state in which the frame mount 84 is mounted on the frame 16 of the human-powered vehicle 10 and all of the wheels 14 of the human-powered vehicle 10 are in contact with a level ground, the rotational center axis C2 of the motor 90 is provided vertically above the rotational center axis C1 of the crankshaft 88 or provided at an upper side Y1 and a front side X1 of the human-powered vehicle 10 with respect to the rotational center axis C1 of the crankshaft 88, and the battery holder 72 is provided at the front side X1 of the human-powered vehicle 10 with respect to the rotational center axis C1 of the crankshaft 88.

The drive system 60 further includes the battery holding device 70. The battery holding device 70 is configured to hold the battery unit 40. The battery holding device 70 includes the battery holder 72. The battery holder 72 is provided on the base 82 and configured to hold the battery unit 40. The battery holder 72 can be provided on the base 82 of the drive unit 80 to be configured to be mounted at a plurality of positions in a predetermined linear direction. The second restriction 62 can be included in the battery holding device 70.

Preferably, the drive unit 80 further includes the battery holder 72. Preferably, the drive unit 80 further includes the battery holder 72 provided on the base 82 and configured to hold the battery unit 40. The battery holder 72 is configured to hold the first end 40A of the battery unit 40. The battery holder 72 can be provided on the exterior of the frame 16 or can be at least partially provided on the battery receptacle 16S or entirely provided on the battery receptacle 16S. Preferably, in a state in which the battery unit 40 is accommodated in the battery receptacle 16S of the frame 16, the battery holder 72 is configured to hold the first end 40A of the battery unit 40. The battery holder 72 includes an accommodation cavity or receptacle 72S on which at least a portion of the battery unit 40 is provided. In a state in which the battery unit 40 is provided in the receptacle 72S, the receptacle 72S extends through the battery holder 72 in the guide direction G. In a state in which the battery unit 40 is provided in the receptacle 72S, the receptacle 72S extends through the battery holder 72 in the longitudinal direction B of the battery unit 40.

The guide 86 is configured to restrict movement of the battery unit 40 in a direction intersecting the guide direction G. Preferably, the guide 86 includes at least one of a recess or a projection extending in the guide direction G. Preferably, the guide 86 is configured to engage a guide engagement portion 46A provided on the housing 46 of the battery unit 40. Preferably, the guide engagement portion 46A includes at least one of a projection or a recess that is complementary to the shape of the guide 86. At least one of a recess and a projection included in the guide 86 extends in the guide direction G. At least one of a projection and a recess included in the guide engagement portion 46A extends in the longitudinal direction B of the battery unit 40.

Preferably, the guide engagement portion 46A is formed from the first end 40A to the second end 40B of the battery unit 40. The guide 86 includes a projection, the guide engagement portion 46A can include a recess. Alternatively, the guide 86 includes a recess, the guide engagement portion 46A can include a projection. In a state in which the guide engagement portion 46A engages the guide 86, the battery unit 40 is configured to be movable in the guide direction G. In a case in which the user attaches the battery unit 40 to the frame 16, the user engages a portion of the guide engagement portion 46A formed on the second end 40B with the guide 86 and moves the battery unit 40 in the first guide direction G1. In a case in which the user detaches the battery unit 40 from the frame 16, the user slides the guide engagement portion 46A along the guide 86 to move the battery unit 40 in the second guide direction G2.

The base 82 can be formed from a metal, a synthetic resin, or both a metal and a synthetic resin. The battery holder 72 can be formed from a metal, a synthetic resin, or both a metal and a synthetic resin. The guide 86 can be formed from a metal, a synthetic resin, or both a metal and a synthetic resin. The synthetic resin can include fiber-reinforced resin.

The battery holder 72 can be configured in various shapes. Battery holders 72E, 72F, 72G, 72H, 72J, 72K, 72L, 72M, and 72N shown in FIGS. 3 to 13 are examples of the battery holder 72. In FIGS. 3 to 13, the drive unit 80 and the battery unit 40 are schematically shown. The battery holders 72E, 72F, 72G, 72H, 72J, 72K, 72L, 72M, and 72N are configured to be attachable to and detachable from the base 82. The drive unit 80 includes the base 82 and a holder mount 98. The holder mount 98 is configured to selectively mount the battery holders 72E, 72F, 72G, 72H, 72J, 72K, 72L, 72M, and 72N at a plurality of positions in the predetermined linear direction. The battery holders 72E, 72F, 72G, 72H, 72J, 72K, 72L, 72M, and 72N are configured to be attachable to and detachable from the drive unit 80 including the crankshaft 88 and the frame mount 84 configured to be mounted on the frame 16 of the human-powered vehicle 10. The battery holders 72E, 72F, 72G, 72H, 72J, 72K, 72L, 72M, and 72N and the frame mount 84 are configured to be mounted on the drive unit 80 at different positions as viewed in a direction in which the crankshaft 88 extends.

The holder mount 98 and the frame mount 84 are located at different positions as viewed in a direction in which the crankshaft 88 extends. Preferably, the base 82 includes a flat surface 82A parallel to the predetermined linear direction. The holder mount 98 is provided on the flat surface 82A. The flat surface 82A is formed, for example, on each of opposite ends 82B and 82C of the base 82 in a direction parallel to the rotational center axis C1 of the crankshaft 88. The flat surface 82A can be formed, for example, on an intermediate portion 82D connecting the opposite ends 82B and 82C of the base 82 in the direction parallel to the rotational center axis C1 of the crankshaft 88. The flat surface 82A can be formed, for example, on the opposite ends 82B and 82C of the base 82 in the direction parallel to the rotational center axis C1 of the crankshaft 88 and the intermediate portion 82D connecting the opposite ends 82B and 82C. Preferably, the base 82 includes a recess 82E. Further preferably, at least part of the holder mount 98 is provided in the recess 82E. The wall surface of the recess 82E is included in the flat surface 82A. Preferably, the holder mount 98 is provided in the vicinity of the opening 16P of the frame 16. Preferably, at least part of the frame mount 84 is provided at the upper side Y1 of the human-powered vehicle 10 with respect to the holder mount 98.

The holder mount 98 includes at least one of a male thread, a female thread, and an elongated hole that extends in the predetermined linear direction. In one example, the holder mount 98 includes an elongated hole 98A and a male threaded fastener 98B having the male thread that is inserted into the elongated hole 98A. In this case, preferably, the holder mount 98 further includes at least one threaded hole 98C with the female thread 98C formed on the base 82. Preferably, the threaded hole 98C with the female thread is provided on each of the opposite ends 82B and 82C of the base 82 in the direction parallel to the rotational center axis C1 of the crankshaft 88 and extends in the direction parallel to the rotational center axis C1 of the crankshaft 88. The threaded hole 98C with the female thread can be provided on at least one of the opposite ends 82B and 82C of the base 82 and the intermediate portion 82D, and extends in a direction intersecting the direction parallel to the rotational center axis C1 of the crankshaft 88. Preferably, at least part of the holder mount 98 is provided on each of the battery holders 72E, 72F, 72G, 72H, 72J, 72K, 72L, 72M, and 72N. For example, each of the battery holders 72E, 72F, 72G, 72H, 72J, 72K, 72L, 72M, and 72N includes two of the elongated holes 98A extending in the predetermined linear direction and two of the male threaded fasteners 98B having the male threads inserted into the elongated holes 98A, respectively, and joined with the threaded holes 98C having the female threads provided on the drive unit 80. The elongated holes 98A are formed in positions corresponding to the threaded holes 98C having the female threads. The each of battery holders 72E, 72F, 72G, 72H, 72J, 72K, 72L, 72M, and 72N includes two abutment or contact portions 75 that are configured to contact or abut the base 82. Preferably, the contact portions 75 contact or abut each of the two ends 82B and 82C of the base 82 from the outer side in the direction parallel to the rotational center axis C1 of the crankshaft 88. The elongated holes 98A are provided in the contact portions 75. Preferably, the contact portions 75 are provided in the recesses 82E. Preferably, at least part of the holder mount 98 is formed integrally with the base 82 as a one-piece structure. For example, the threaded holes 98C having the female threads are formed integrally with the base 82. At least part of the holder mount 98 and the base 82 are formed to have a one-piece structure. The base 82 can be configured to include a plurality of members. In this case, a part of the base 82 and at least part of the holder mount 98 are formed integrally as a one-piece structure.

Figure 4:
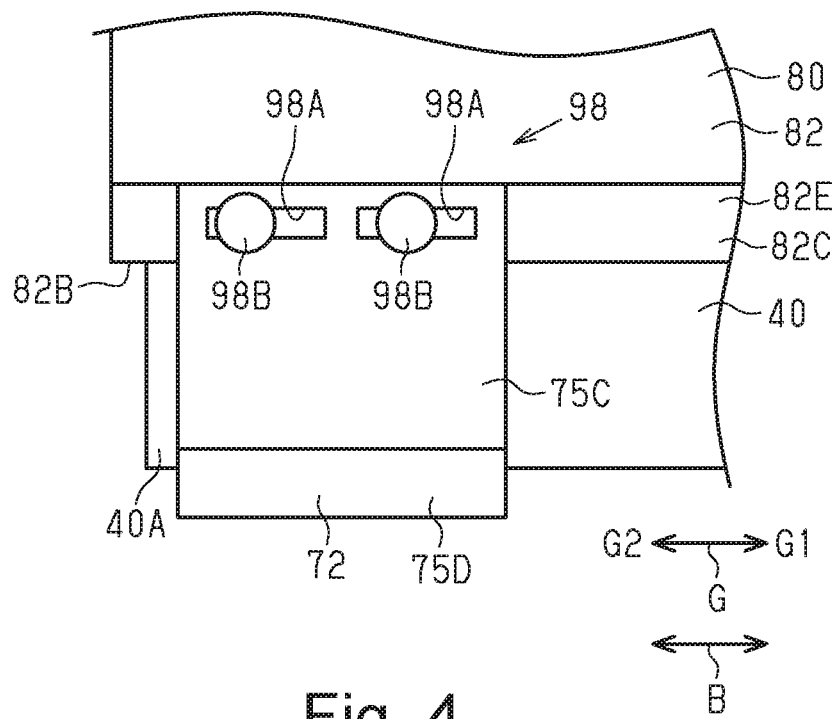
FIG. 4 is a partial side view of the drive unit including the holder mount and the battery holder shown in FIG. 3.

The battery holder 72 shown in FIG. 4 is configured to be mounted on the drive unit 80 provided with the crankshaft 88 at a plurality of positions in the predetermined linear direction. The predetermined linear direction can include a direction intersecting a direction in which the crankshaft 88 extends. Preferably, the predetermined linear direction is orthogonal to the direction in which the crankshaft 88 extends. Preferably, in a state mounted on the frame 16 of the human-powered vehicle 10, the predetermined linear direction extends in the longitudinal direction F of the frame 16 of the human-powered vehicle 10. Preferably, the predetermined linear direction extends in a direction in which the down tube 16A extends. Preferably, the predetermined linear direction coincides with the guide direction G. The configuration of the holder mount 98 shown in FIG. 4 is applicable to each of the battery holders 72F, 72G, 72H, 72J, 72K, 72L, 72M, and 72N in addition to the battery holder 72E. Preferably, the battery holders 72E, 72F, 72G, 72H, 72J, 72K, 72L, 72M, and 72N are configured to be movable in the guide direction G.

Figure 5:
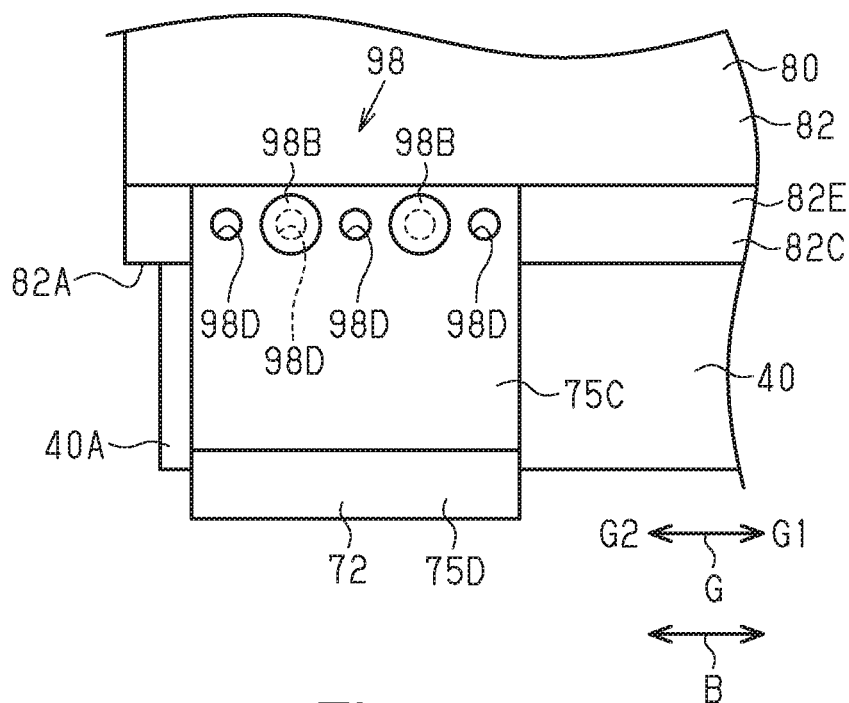
FIG. 5 is a partial side view of a drive unit including a modified example of a holder mount and a modified example of a battery holder.

The holder mount 98 can be configured to be non-movable in the predetermined linear direction. The battery holder 72 shown in FIG. 5 does not have to include the elongated holes 98A. The battery holder 72 shown in FIG. 5 includes a plurality of circular holes 98D aligned in the guide direction G instead of the elongated holes 98A. In this case, each of the male threaded fasteners 98B is inserted into a predetermined hole 98D of the holes 98D so that the position of the battery holder 72 is adjusted relative to the drive unit 80 and the frame 16 in the guide direction G. The battery holder 72 shown in FIG. 5 can be configured be mounted at a single position in the predetermined linear direction. The configuration of the holder mount 98 shown in FIG. 5 is applicable to each of the battery holders 72F, 72G, 72H, 72J, 72K, 72L, 72M, and 72N in addition to the battery holder 72E.

Figure 3:
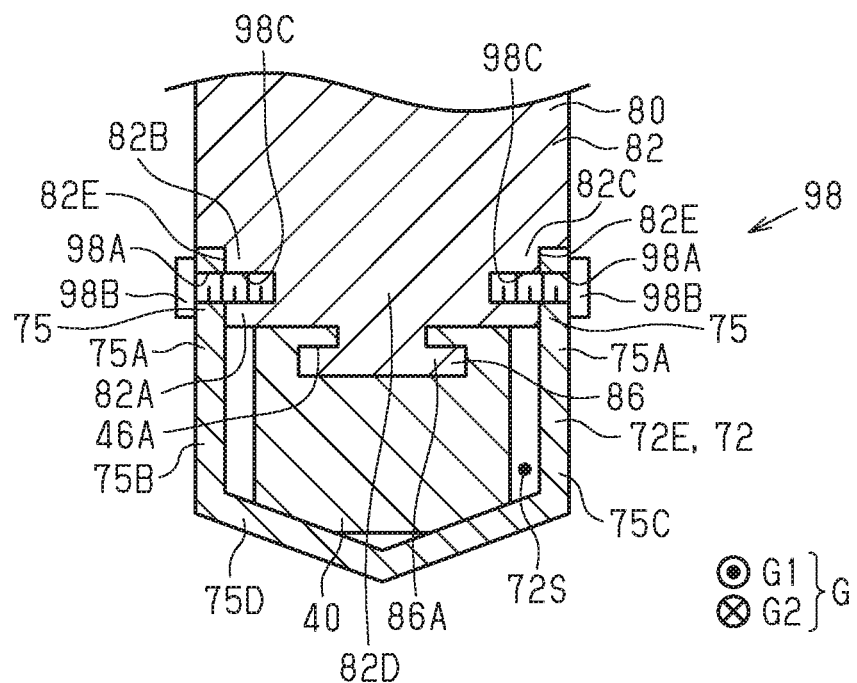
FIG. 3 is a partial cross-sectional view of a first example of a battery holder and a holder mount, a base, and a battery unit taken from the cross section II-II shown in FIG. 2.
Figure 6:
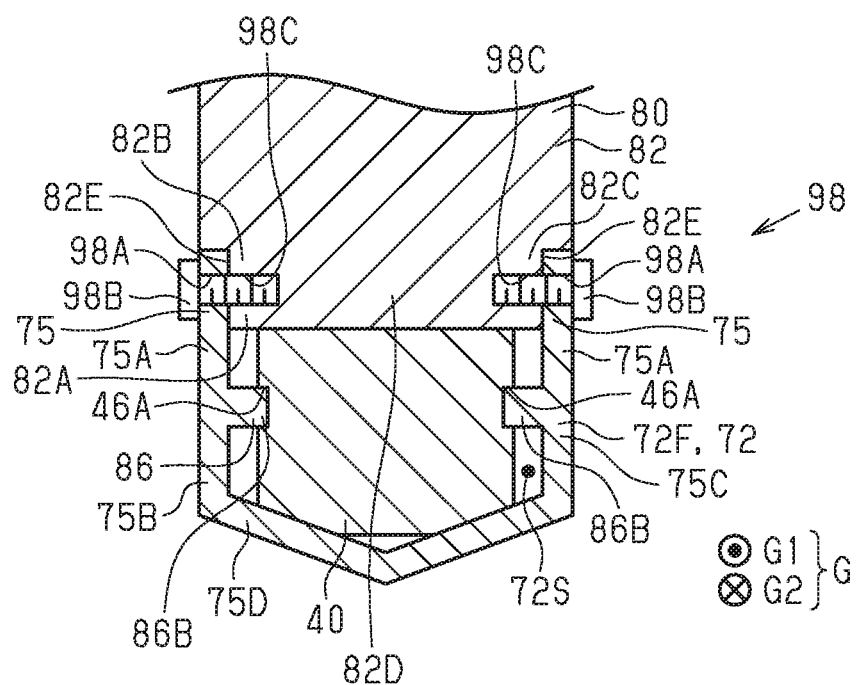
FIG. 6 is a partial cross-sectional view of a second example of a battery holder and a holder mount, a base, and a battery unit taken from the cross section II-II shown in FIG. 2.
Figure 7:
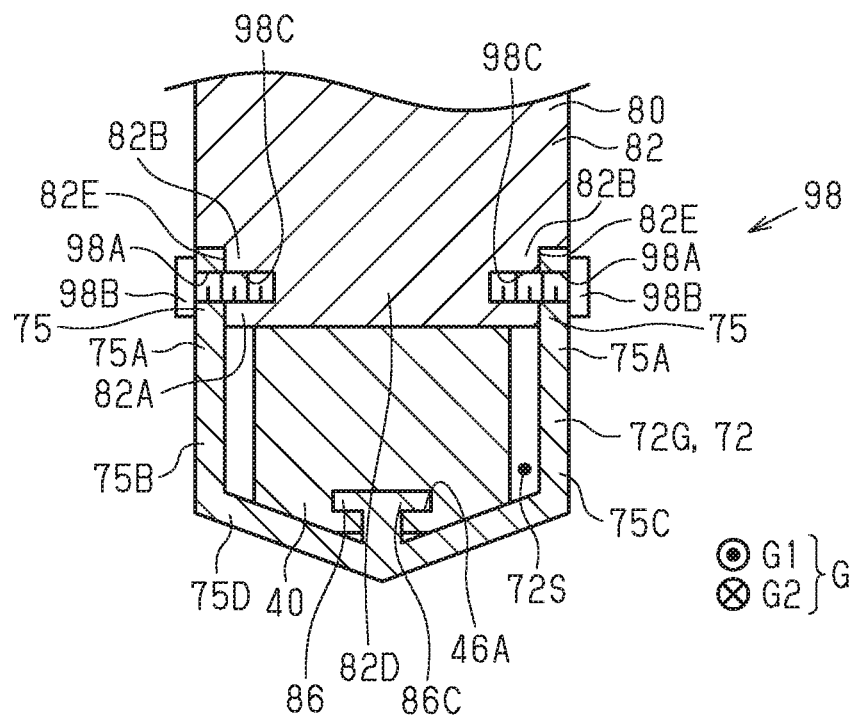
FIG. 7 is a partial cross-sectional view of a third example of a battery holder and a holder mount, a base, and a battery unit taken from the cross section II-II shown in FIG. 2.
Figure 8:
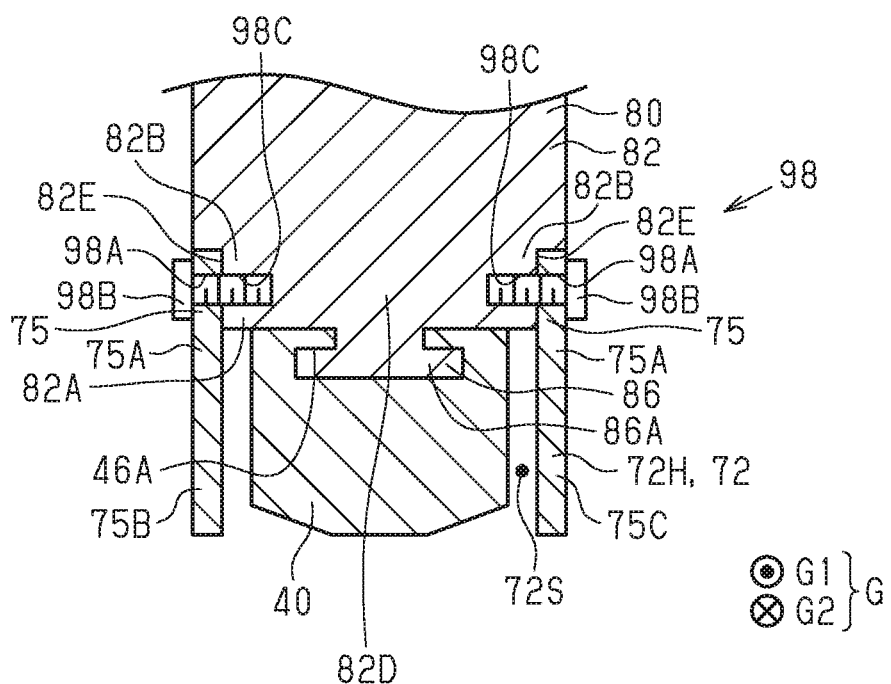
FIG. 8 is a partial cross-sectional view of a fourth example of a battery holder and a holder mount, a base, and a battery unit taken from the cross section II-II shown in FIG. 2.

The battery holder 72E shown in FIG. 3, the battery holder 72F shown in FIG. 6, the battery holder 72G shown in FIG. 7, and the battery holder 72H shown in FIG. 8 form the receptacle 72S together with the outer peripheral wall surface of the base 82. The battery holders 72E, 72F, 72G, and 72H each include base connections 75A provided on each of the opposite ends 82B and 82C of the base 82 in the direction parallel to the rotational center axis C1 of the crankshaft 88 and two walls 75B and 75C projecting from the respective base connections 75A. The battery holders 72E, 72F, 72G further each include a cover 75D connected to an end of each of the two walls 75B and 75C opposite to the base 82. Parts of the contact portions 75 are provided on the base connections 75A, respectively. The base connections 75A extend, for example, parallel to the rotational center axis C1 of the crankshaft 88 in the guide direction G. Each of the two walls 75B and 75C extends in the guide direction G and in a direction orthogonal to the direction parallel to the rotational center axis C1 of the crankshaft 88. In a state in which the battery unit 40 is not provided in the receptacle 72S, the cover 75D is provided to face the base 82 and the base connection 75A. In the guide direction G, the two walls 75B and 75C are equal in length to the cover 75D. The cover 75D is configured, for example, to be separated from the base 82 at positions toward a central portion in a direction parallel to the rotational center axis C1 of the crankshaft 88. The two walls 75B and 75C and the cover 75D can have various shapes in accordance with the shape of the battery unit 40. The holder mount 98 is provided on the ends of the two walls 75B and 75C provided toward the base 82. The guide 86 is not provided on the battery holder 72E and the battery holder 72H. The guide 86 is provided on the battery holder 72F and the battery holder 72G. Preferably, in the battery holder 72H shown in FIG. 8, as viewed in a direction parallel to the rotational center axis C1 of the crankshaft 88, the two walls 75B and 75C extend to a position where the battery unit 40 is covered in the direction in which the crankshaft 88 extends and a direction orthogonal to the guide direction G. Preferably, the base connection 75A and the two walls 75B and 75C are formed integrally as a one-piece structure. Preferably, the base connection 75A, the two walls 75B and 75C, and the cover 75D are formed integrally as a one-piece structure.

The guide 86 is provided on the base 82 on which the battery holder 72E shown in FIG. 3 is provided and the base 82 on which the battery holder 72H shown in FIG. 8 is provided. The guide 86 forms the receptacle 72S together with the base 82 and the battery holder 72E or the battery holder 72H. The guide 86 is provided in a region including the central portion of the base 82 in a direction parallel to the rotational center axis C1 of the crankshaft 88. The guide 86 shown in FIG. 3 includes a single protrusion 86A. The protrusion 86A has a T-shaped cross section in a direction orthogonal to the guide direction G. In the guide 86 shown in FIG. 3, the guide 86 can include a plurality of protrusions 86A. In this case, the protrusions 86A are separated in a direction parallel to the rotational center axis C1 of the crankshaft 88. The guide 86 is integral with the base 82 as a one-piece structure.

The guide 86 provided on the battery holder 72F shown in FIG. 6 is provided on each of the two walls 75B and 75C. In FIG. 6, the guide 86 includes two protrusions 86B protruding from opposing surfaces of the two walls 75B and 75C. The two protrusions 86B extend, for example, in the guide direction G. The two protrusions 86B can be formed throughout between opposite ends of the two walls 75B and 75C in the guide direction G. In FIG. 6, the two protrusions 86B have a rectangular cross section in a direction orthogonal to the guide direction G. However, any shape can be used as long as the shape is configured to guide the battery unit 40. Preferably, in a state in which the battery unit 40 is not provided in the receptacle 72S, the two protrusions 86B are provided to face each other in a direction parallel to the rotational center axis C1 of the crankshaft 88.

The guide 86 provided on the battery holder 72G shown in FIG. 7 is provided on the cover 75D. The guide 86 is provided in a region including a central portion of the cover 75D in a direction parallel to the rotational center axis C1 of the crankshaft 88. In FIG. 5, the guide 86 includes a single protrusion 86C. The protrusion 86C has a T-shaped cross section in a direction orthogonal to the guide direction G. In the guide 86 shown in FIG. 5, the guide 86 can include a plurality of protrusions 86C. In this case, the protrusions 86C are separated in a direction parallel to the rotational center axis C1 of the crankshaft 88. As in the battery holder 72H shown in FIG. 8, the battery holder 72E shown in FIG. 3, the battery holder 72F shown in FIG. 6, and the battery holder 72G shown in FIG. 7 include the two walls 75B and 75C, and the cover 75D can be omitted.

Figure 9:
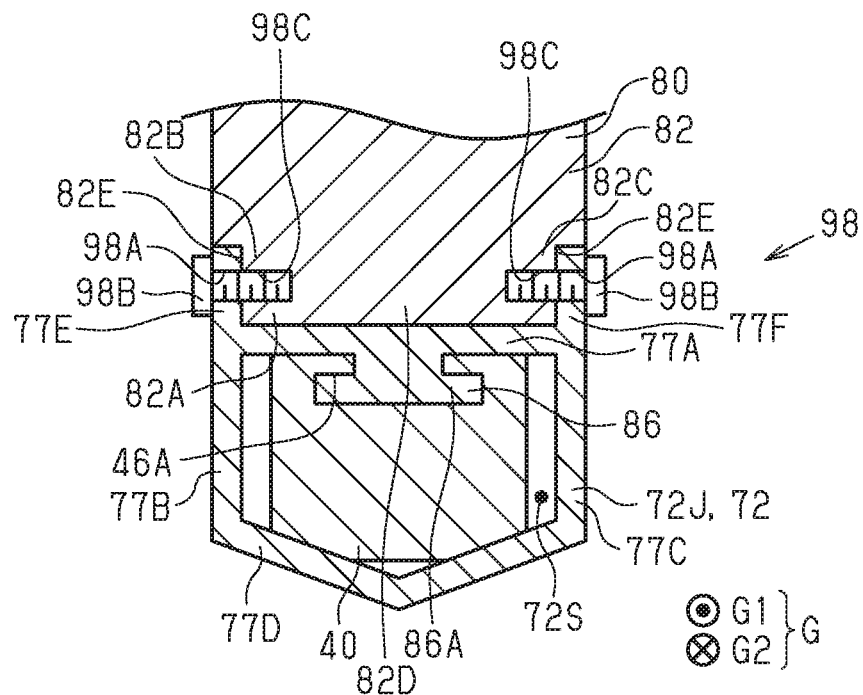
FIG. 9 is a partial cross-sectional view of a fifth example of a battery holder and a holder mount, a base, and a battery unit taken from the cross section II-II shown in FIG. 2.
Figure 10:
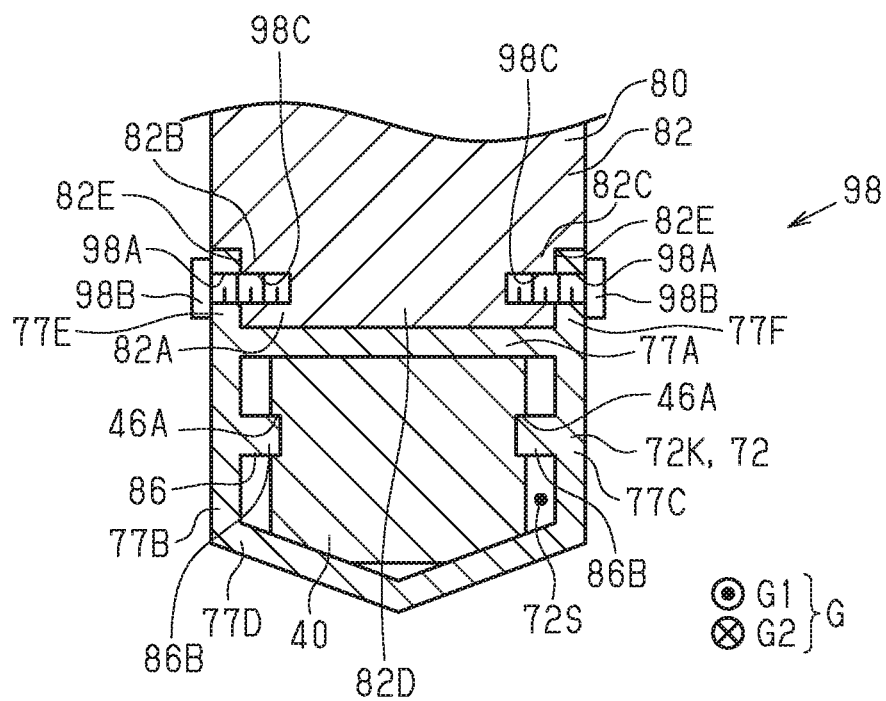
FIG. 10 is a partial cross-sectional view of a sixth example of a battery holder and a holder mount, a base, and a battery unit taken from the cross section II-II shown in FIG. 2.
Figure 11:
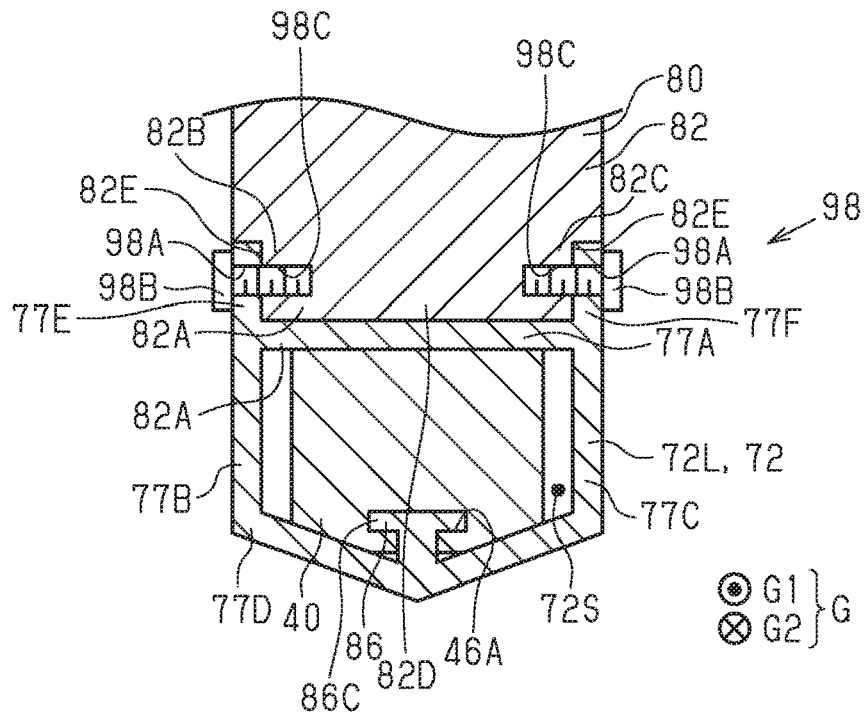
FIG. 11 is a partial cross-sectional view of a seventh example of a battery holder and a holder mount, a base, and a battery unit taken from the cross section II-II shown in FIG. 2.
Figure 12:
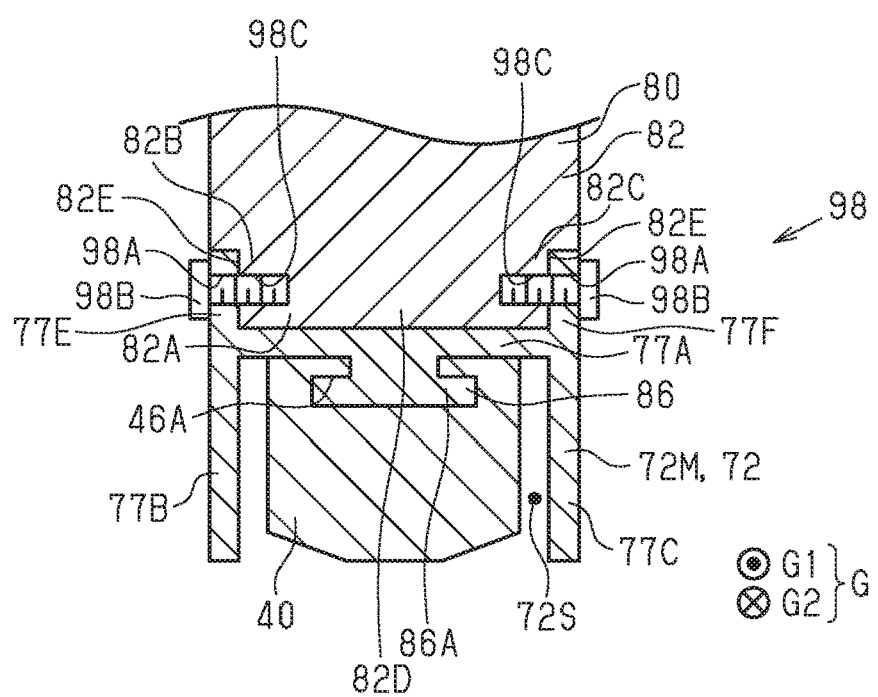
FIG. 12 is a partial cross-sectional view of an eighth example of a battery holder and a holder mount, a base, and a battery unit taken from the cross section II-II shown in FIG. 2.
Figure 13:
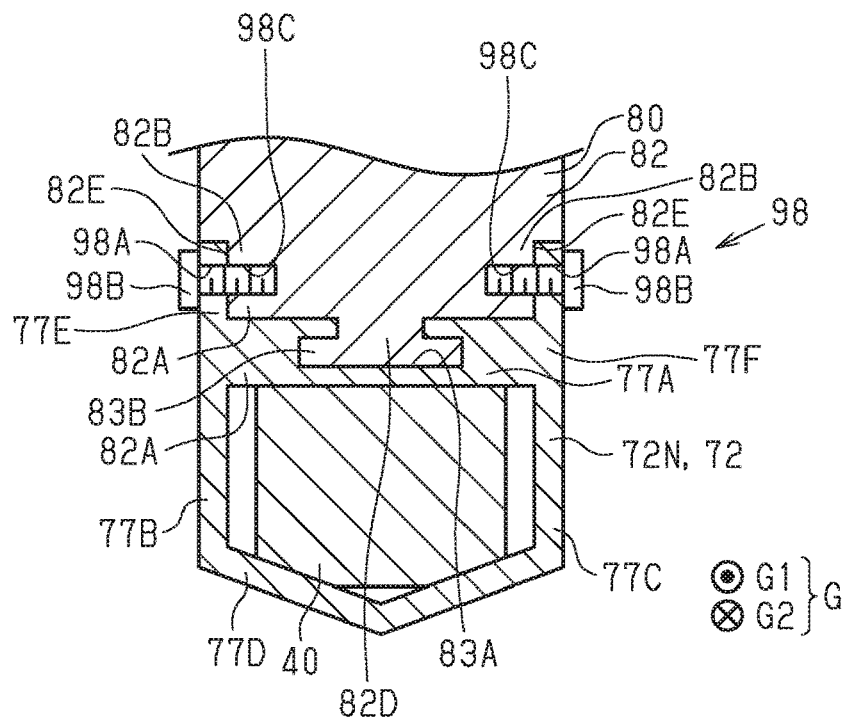
FIG. 13 is a partial cross-sectional view of a ninth example of a battery holder and a holder mount, a base, and a battery unit taken from the cross section II-II shown in FIG. 2.

The battery holder 72J shown in FIG. 9, the battery holder 72K shown in FIG. 10, the battery holder 72L shown in FIG. 11, the battery holder 72M shown in FIG. 12, and the battery holder 72N shown in FIG. 13 each include a base connection 77A connected to the base 82 and two walls 77B and 77C projecting from opposite ends of the base connection 77A in a direction parallel to the rotational center axis C1 of the crankshaft 88.

The battery holder 72J shown in FIG. 9, the battery holder 72K shown in FIG. 10, the battery holder 72L shown in FIG. 11, and the battery holder 72N shown in FIG. 13 include a cover 77D connected to an end of each of the two walls 77B and 77C opposite to the base connection 77A. The base connection 77A includes first base connections 77E configured in the same manner as in the battery holder 72E and a second base connection 77F connecting the two first base connections 77E. Preferably, the second base connection 77F is configured to contact the intermediate portion 82D of the base 82. Part of the base 82 is provided in a space defined by the first base connections 77E and the second base connection 77F. Preferably, the intermediate portion 82D of the base on which the battery holders 72J, 72K, 72L, and 72N are provided includes the flat surface 82A. The shape of the two walls 77B and 77C is similar to the shape of the two walls 75B and 75C. The shape of the cover 77D is similar to the shape of the cover 75D. Preferably, the base connection 77A and the two walls 77B and 77C are formed integrally as a one-piece structure. Preferably, the base connection 77A, the two walls 77B and 77C, and the cover 77D of the battery holders 72J, 72K, 72L, and 72N are formed integrally as a one-piece structure. The two walls 77B and 77C of the battery holder 72M shown in FIG. 12 are formed in the same manner as the two walls 75B and 75C of the battery holder 72H shown in FIG. 8.

The guide 86 provided on the battery holder 72J shown in FIG. 9 and the battery holder 72M shown in FIG. 12 is provided on the base connection 77A. The guide 86 is provided in a region including the central portion of the base connection 77A in a direction parallel to the rotational center axis C1 of the crankshaft 88. The shape of the guide 86 shown in FIGS. 9 and 12 is similar to the shape of the guide 86 shown in FIG. 3. The guide 86 shown in FIGS. 9 and 12 is formed integrally with the battery holders 72J and 72M as a one-piece structure.

The guide 86 provided on the battery holder 72K shown in FIG. 10 is provided on the two walls 77B and 77C. The guide 86 shown in FIG. 10 and the guide 86 shown in FIG. 6 have similar configurations.

The guide 86 provided on the battery holder 72L shown in FIG. 11 is provided on the cover 77D. The guide 86 is provided in a region including a central portion of the cover 77D in a direction parallel to the rotational center axis C1 of the crankshaft 88. The shape of the guide 86 shown in FIG. 11 is similar to the shape of the guide 86 shown in FIG. 7.

As in the battery holder 72M shown in FIG. 12, the battery holder 72J shown in FIG. 9 and the battery holder 72K shown in FIG. 10 include the two walls 77B and 77C, and the cover 77D can be omitted.

In the battery holder 72N shown in FIG. 13, the guide 86 is formed by at least one of the base connection 77A, the two walls 77B and 77C, and the cover 77D. In the battery holder 72N shown in FIG. 13, for example, the guide 86 is configured by the base connection 77A and the cover 77D. In the battery holder 72N, a recess 83A can be provided on one of a portion of the base connection 77A facing the base 82 and a portion of the base 82 facing the base connection 77A, and a projection 83B complementary to the recess 83A can be provided on the other. The battery holder 72N is configured to be movable along the recess 83A or the projection 83B of the base 82. Preferably, the recess 83A and the projection 83B extend in the predetermined linear direction. Preferably, the recess 83A and the projection 83B are configured to hamper movement of the battery holder 72N in a direction intersecting the predetermined linear direction. The shape of the projection 83B is, for example, similar to the shape of the protrusion 86A of the guide 86 shown in FIG. 3. In the same manner as the battery holder 72N shown in FIG. 13, in the battery holder 72J shown in FIG. 9, the battery holder 72K shown in FIG. 10, the battery holder 72L shown in FIG. 11, and the battery holder 72M shown in FIG. 12, the recess 83A can be provided on one of a portion of the base connection 77A facing the base 82 and a portion of the base connection 77A facing the base 82, and the projection 83B can be provided on the other.

In a state in which the battery unit 40 is guided in the guide 86, the battery holder 72 is configured to hold the battery unit 40. Preferably, the battery holder 72 includes a restriction 74 that restricts movement of the battery unit 40 in the predetermined linear direction. The battery holder 72 further includes a first restriction 74A that restricts movement of the battery unit 40 in the guide direction G. Preferably, the restriction 74 includes the first restriction 74A. The first restriction 74A is configured to restrict movement of the battery unit 40 in at least the second guide direction G2. Preferably, the first restriction 74A is configured to restrict movement of the battery unit 40 in the first guide direction G1 and movement of the battery unit 40 in the second guide direction G2. The first restriction 74A engages the third restriction 48 of the battery unit 40 to restrict movement of the battery unit 40. In the present embodiment, the battery holder 72 includes two of the first restriction 74A and the battery unit 40 includes two of the third restriction 48.

Preferably, in a state in which the battery unit 40 is held by the battery holder 72, the first restrictions 74A face the battery unit 40 in a direction parallel to the rotational center axis C1 of the crankshaft 88. In a state in which the battery unit 40 is held by the battery holder 72, the first restrictions 74A can be configured to face the battery unit 40 in a direction that is orthogonal to the guide direction G and orthogonal to a direction parallel to the rotational center axis C1 of the crankshaft 88.

Each of the third restrictions 48 of the battery unit 40 includes a first engagement portion 48A. The first engagement portion 48A projects in a direction intersecting the longitudinal direction F of the frame 16 from an intermediate portion between opposite end surfaces of the housing 46 in a direction extending in the longitudinal direction F of the frame 16. The first engagement portion 48A is movable between a first position that restricts movement of the housing 46 in the longitudinal direction F of the frame 16 and a second position that is retracted from the first position and allows movement of the housing 46 in the longitudinal direction F of the frame 16. The intermediate portion between opposite end surfaces of the housing 46 includes a portion of the housing 46 excluding the opposite surfaces in the longitudinal direction B. The first restriction 74A includes a second engagement portion 74B that engages the first engagement portion 48A provided on the battery unit 40. One of the first engagement portion 48A and the second engagement portion 74B includes a projection. The other one of the first engagement portion 48A and the second engagement portion 74B includes a recess.

The battery unit 40 includes two biasing portions 50 that bias the respective ones of the first engagement portions 48A to the first position and two operating portions 52 operable by the user to move the first engagement portions 48A from the first position to the second position. Preferably, each of the biasing portions 50 includes an elastic member. Each of the biasing portion 50 includes, for example, a plate or leaf spring.

Figure 14:
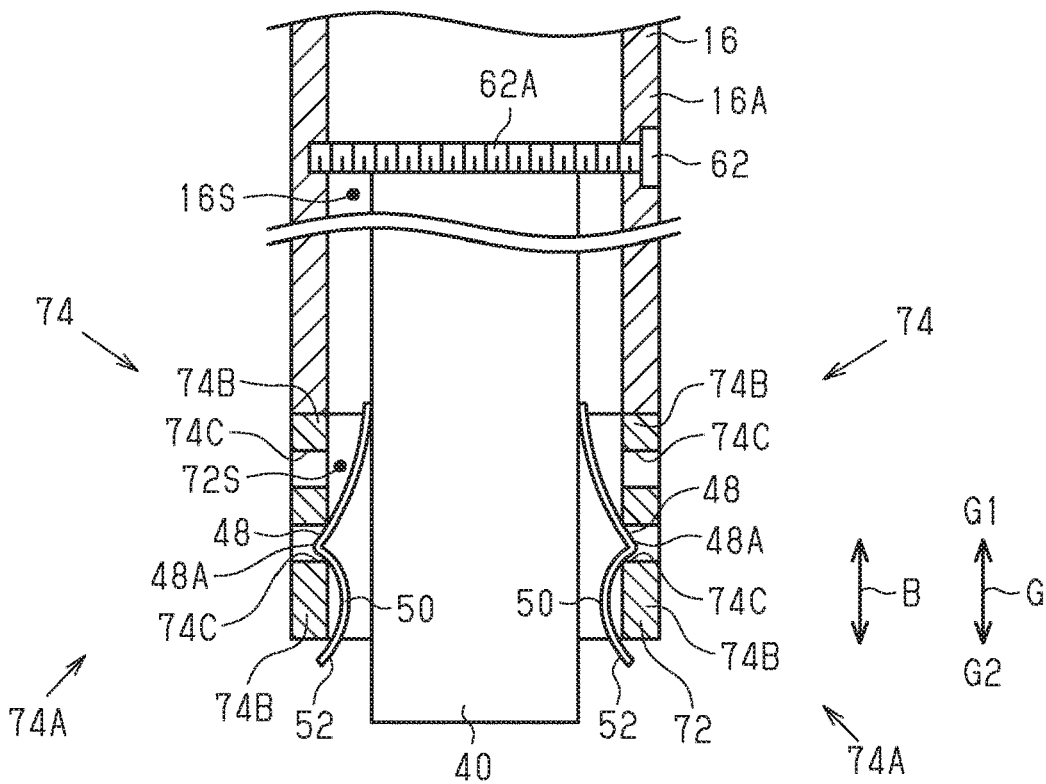
FIG. 14 is a cross-sectional view of the battery holder, the frame, and the battery unit taken from the cross section III-III shown in FIG. 2 in a state in which a first restriction restricts movement of the battery holder in a guide direction.
Figure 15:
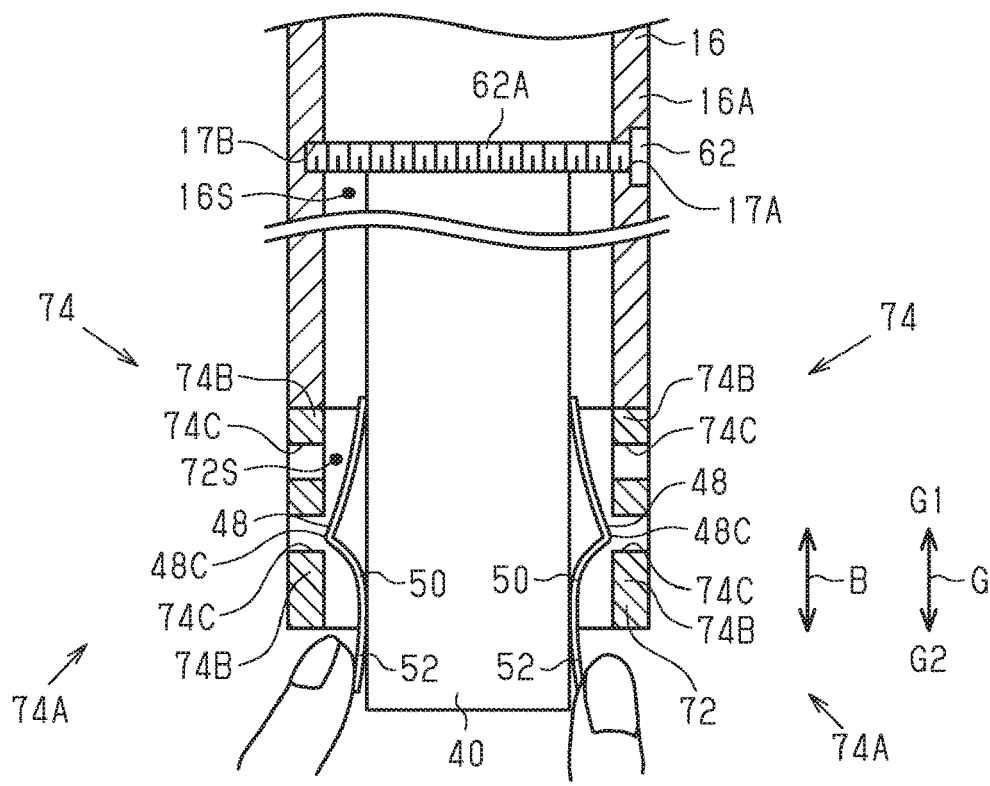
FIG. 15 is a cross-sectional view of the battery holder, the frame, and the battery unit taken from the cross section III-III shown in FIG. 2 in a state in which the first restriction allows movement of the battery holder in the guide direction.
Figure 16:
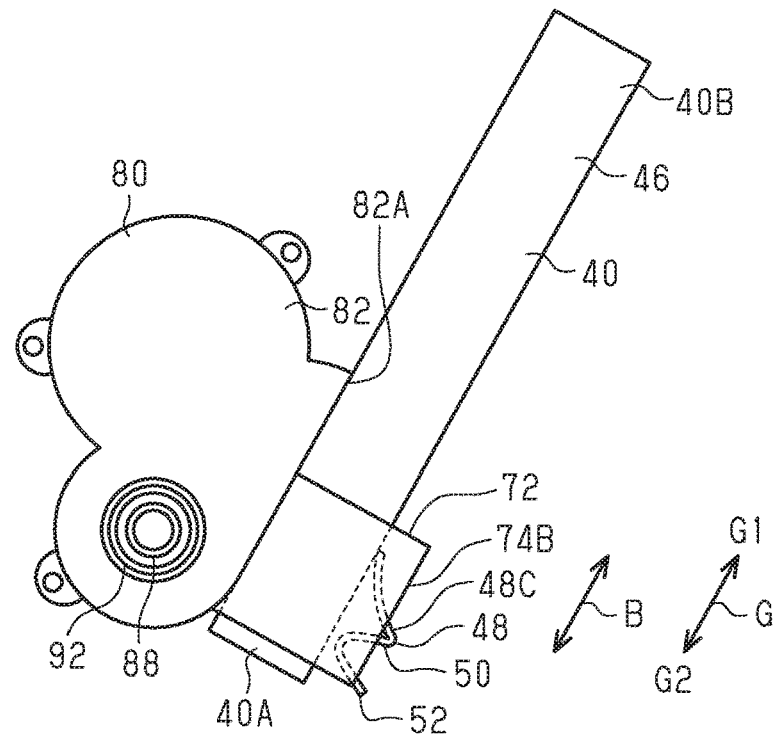
FIG. 16 is a side view of a drive unit system shown in FIG. 2 in which the first restriction is changed to a modified example.
Figure 17:
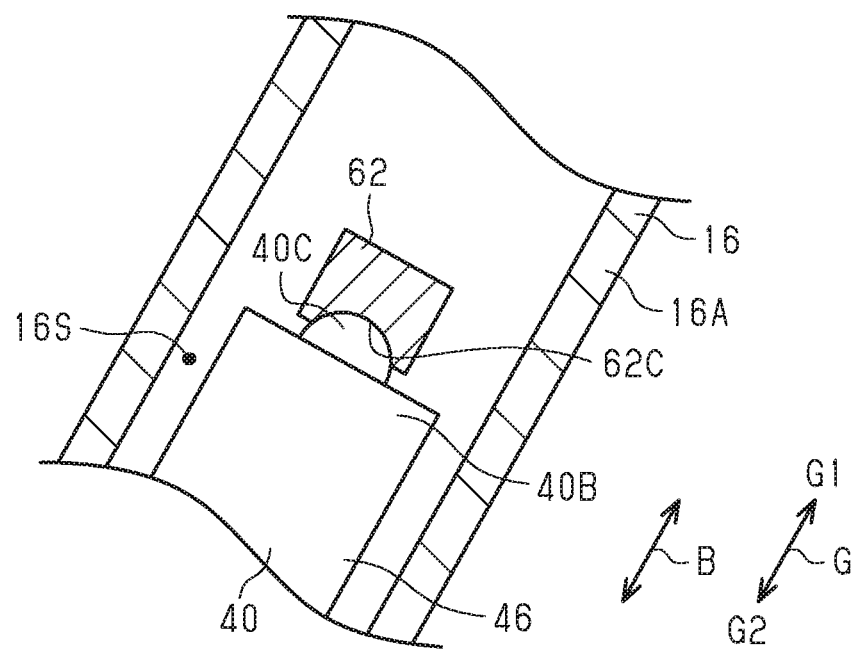
FIG. 17 is a partial cross-sectional view of the drive unit system shown in FIG. 2 in which a second restriction is changed to a modified example.
Figure 18:
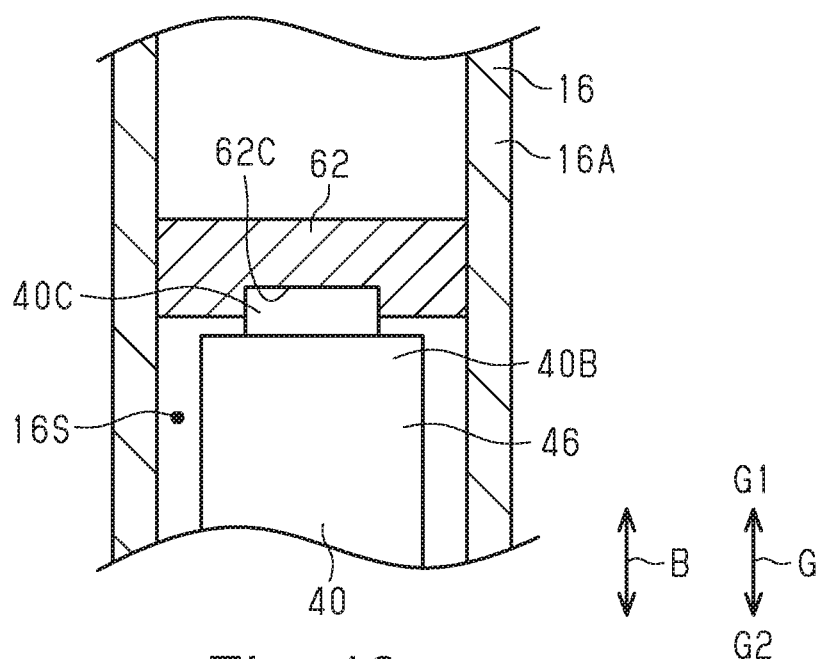
FIG. 18 is a partial cross-sectional view of the second restriction shown in FIG. 17 that is rotated 90° about an axis parallel to a longitudinal direction of the frame.

As shown in FIGS. 14 and 15, the first engagement portion 48A, the biasing portion 50, and the operating portion 52 are formed integrally as a one-piece structure. For example, a leaf spring can be bent to integrally form the first engagement portion 48A, the biasing portion 50, and the operating portion 52. In a case in which the first engagement portion 48A and the operating portion 52 are formed integrally, the biasing portion 50 can be configured to be a separate body from the first engagement portion 48A and the operating portion 52. In this case, the biasing portion 50 can include, for example, a coil spring instead of a leaf spring. Preferably, the first engagement portion 48A, the biasing portion 50, and the operating portion 52 are provided on a side surface of the housing 46 extending in the longitudinal direction B. Preferably, the first engagement portion 48A, the biasing portion 50, and the operating portion 52 are provided on two side surfaces of the housing 46 extending in a direction intersecting the longitudinal direction B. As shown in FIG. 16, alternatively, only one first engagement portion 48A, only one biasing portion 50, and only one operating portion 52 can be provided on the housing 46.

In the present embodiment, the battery holder 72 holds the battery unit 40 so that a portion including the end surface of the first end 40A of the housing 46 is exposed from the battery holder 72 as viewed in a direction parallel to the rotational center axis C1 of the crankshaft 88. The battery holder 72 can hold the battery unit 40 so that the first end 40A of the housing 46 is not exposed from the battery holder 72 as viewed in a direction parallel to the rotational center axis C1 of the crankshaft 88. In a state in which the battery unit 40 is held by the battery holder 72, the operating portion 52 is provided on the first end 40A of the housing 46 so that at least part of the operating portion 52 is exposed from the battery holder 72. The first engagement portion 48A is provided on an intermediate portion between the biasing portion 50 and the operating portion 52 in the longitudinal direction B of the battery unit 40. The first engagement portion 48A includes a bent portion 48C provided on an intermediate portion of the biasing portion 50 in the longitudinal direction B of the battery unit 40. The second engagement portion 74B of the battery holder 72 includes a hole 74C. Preferably, the second engagement portion 74B includes a plurality of holes 74C provided in the longitudinal direction F of the frame 16.

As shown in FIG. 15, in a case in which the user operates the operating portions 52, the biasing portions 50 deform to decrease the projecting amount of the first engagement portions 48A from the housing 46, and disengage the first engagement portions 48A from the second engagement portions 74B. Preferably, each of the first engagement portions 48A is configured to be disengaged from a corresponding one of the second engagement portion 74B in a case in which the battery unit 40 is moved in the first guide direction G1. This eliminates the need for operating the operating portions 52 to disengage the first engagement portions 48A from the second engagement portions 74B in a case in which the battery unit 40 is to be moved in the first guide direction G1. Thus, the battery unit 40 is further readily attached to the battery holder 72. For example, the leaf spring configuring the biasing portion 50 is configured to be separated from the housing 46 from the upstream side toward the downstream side in the first guide direction G1. As a result, in a case in which the battery unit 40 is moved in the first guide direction G1, the inner wall surface of the guide 86 presses the biasing portions 50, and the first engagement portions 48A are disengaged from the second engagement portions 74B. In a case in which the user does not operate the operating portions 52, the first engagement portions 48A are biased toward the outer side of the housing 46. In a case in which the first engagement portions 48A are located at a position corresponding to one of the holes 74C in the second engagement portions 74B, the first engagement portions 48A are fitted into the corresponding one of the holes 74C of the first restrictions 74A. Thus, movement of the battery unit 40 is restricted. In the present embodiment, in a case in which the first engagement portions 48A are fitted into the corresponding one of the holes 74C in the first restrictions 74A, movement of the battery unit 40 in the second guide direction G2 is restricted.

The second restriction 62 can be configured in various shapes. The second restriction 62 can be configured to restrict movement of the battery unit 40 in a direction intersecting the first guide direction G1 in addition to restricting movement of the battery unit 40 in the first guide direction G1. The second restriction 62 includes, for example, one of a projection and a recess. The second restriction 62 can be bolted to the frame 16 or can be welded to the frame 16. Preferably, the second end 40B of the battery unit 40 includes the other one of the projection and the recess that is complementary to the shape of the one of the projection and the recess included in the second restriction 62. The second restriction 62 shown in each of FIGS. 17 and 18 includes a recess 62C, and the second end 40B of the battery unit 40 includes a projection 40C. Insertion of the projection 40C into the recess 62C restricts movement of the battery unit 40 in a direction intersecting the longitudinal direction of the frame 16. The wall surface of the recess 62C is formed to decrease from the opening toward the bottom surface in a plane that is parallel to the longitudinal direction F of the frame 16 and orthogonal to the rotational center axis C1 of the crankshaft 88. The wall surface of the recess 62C is formed to be U-shaped in a plane that is parallel to the longitudinal direction F of the frame 16 and orthogonal to the rotational center axis C1 of the crankshaft 88. For example, an elastic member formed from an elastic resin such as a synthetic rubber or an elastomer can be provided on one of a portion of the second restriction 62 that contacts the battery unit 40 and a portion of the battery unit 40 that contacts the second restriction 62.

Preferably, the drive unit 80 further includes the electrical connector 94 electrically connecting the battery unit 40 and the motor 90. Preferably, the electrical connector 94 is provided closer to the rotational center axis C1 of the crankshaft 88 than the rotational center axis C2 of the motor 90. The electrical connector 94 is provided on the base 82. An electrical connector 44 is provided on the battery unit 40 to be attachable to and detachable from the electrical connector 94. The electrical connector 44 is provided on the first end 40A of the battery unit 40. The electrical connector 44 is provided on an end surface of the first end 40A of the battery unit 40 in the longitudinal direction B of the battery unit 40.

Figure 2:
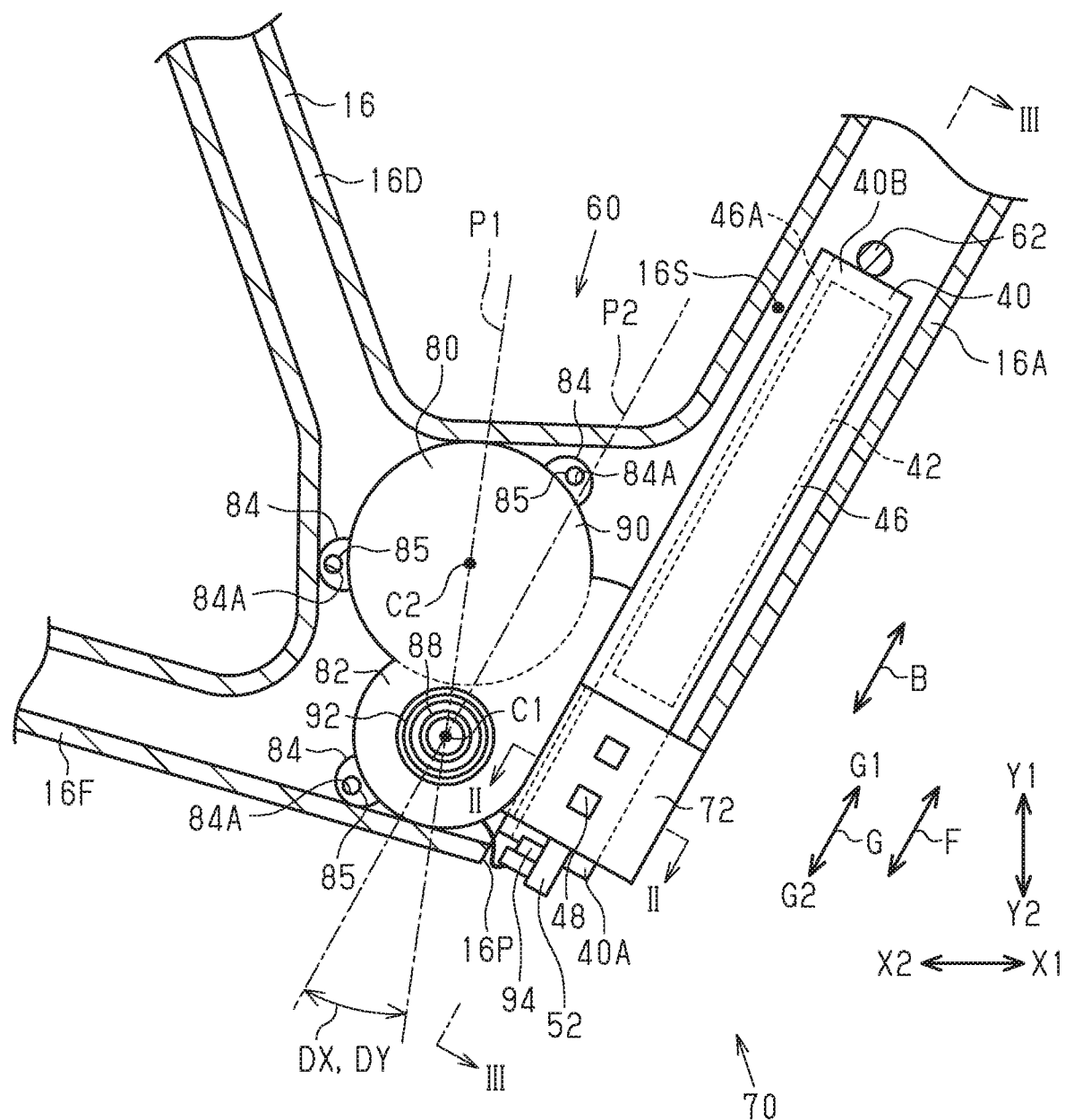
FIG. 2 is a partial cross-sectional view of a frame of the human-powered vehicle shown in FIG. 1.
Figure 19:
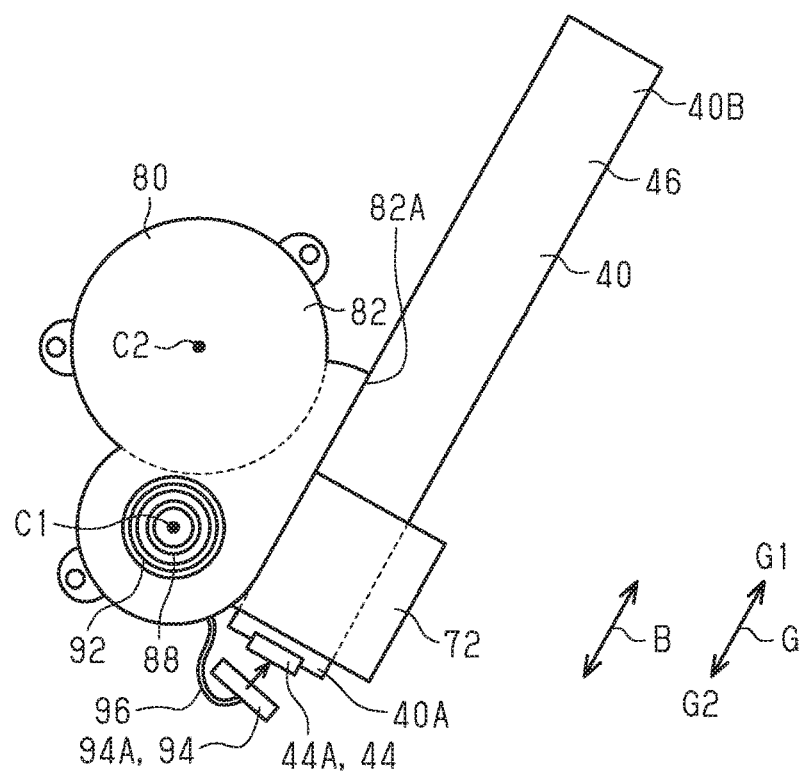
FIG. 19 is a side view of the drive unit system shown in FIG. 2 in which an electrical connector of the drive unit is connected to an electrical connector of the battery unit.

As shown in FIGS. 2 and 19, for example, the electrical connector 94 can include the electrical connector 94A, and the electrical connector 44 can include the electrical connector 44A. The drive unit 80 includes the battery holder 72 provided on the base 82 and configured to hold the battery unit 40 and an electrical cable 96 extending from the base 82 and electrically connected to the electrical connector 94A. In a state in which the battery unit 40 is held by the battery holder 72, the electrical connector 94A is provided on a portion of the base 82 joined with the electrical connector 44A provided on the battery unit 40. The electrical cable 96 is electrically connected to a circuit board provided on the base 82. The electrical connector 94A is coupled to one end of the electrical cable 96. The other end of the electrical cable 96 can be provided, for example, in the housing 46. The other end of the electrical cable 96 can be connected in an attachable and detachable manner to an electrical connector connected to an electrical connector provided on the peripheral portion of the housing 46. The electrical cable 96 allows movement of the electrical connector 94A with respect to the base 82. Thus, the electrical connector 94A is connectable to the electrical connector 44A at a plurality of positions in the guide direction G of the electrical connector 94A.

Figure 20:
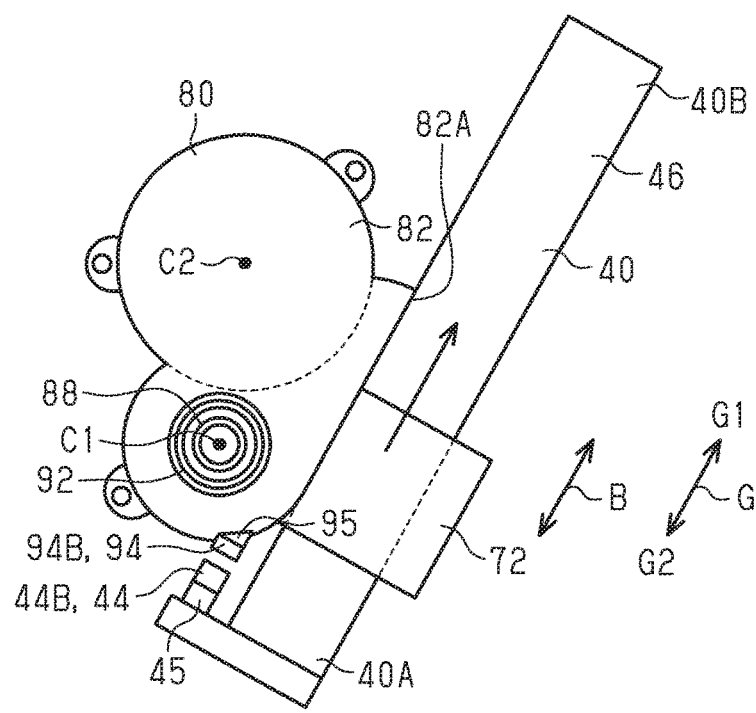
FIG. 20 is a side view of the drive unit shown in FIG. 19 in which the electrical connector is changed to a modified example.

As shown in FIG. 20, for example, the electrical connector 94 can include the electrical connector 94B, and the electrical connector 44 can include the electrical connector 44B. In a case in which the battery unit 40 is held by the battery holder 72, the electrical connector 94B is configured to be electrically connected to the battery unit 40. In a state in which the battery unit 40 is held by the battery holder 72, the electrical connector 94B is provided on the portion of the base 82 configured to be joined with the electrical connector 44B provided on the battery unit 40. In the base 82, preferably, in a state in which the battery unit 40 is held by the battery holder 72, the electrical connector 44B is provided on a portion of the base 82 configured to face the electrical connector 94B in the guide direction G. Preferably, at least one of the electrical connector 94B and the electrical connector 44B is configured to be movable in the guide direction G. Movement of at least one of the electrical connector 94B and the electrical connector 44B in the guide direction G allows the electrical connector 94B to be connected to the electrical connector 44B at a plurality of positions in the guide direction G. At least one of the electrical connector 94B and the electrical connector 44B is mounted on a mount subject via an elastic member. In FIG. 20, for example, the electrical connector 94B is mounted on the base 82 via an elastic member 95. For example, the electrical connector 44B can be mounted on the base 82 via an elastic member 45. The elastic members 95 and 45 include, for example, an elastomer or a coil spring. In a case in which the elastic members 95 and 45 are compressed, the position of the electrical connector 94B or the electrical connector 44B relative to the mount subject is changed. Thus, the electrical connector 94B is electrically connected to the electrical connector 44B in a favorable manner.

Figure 21:
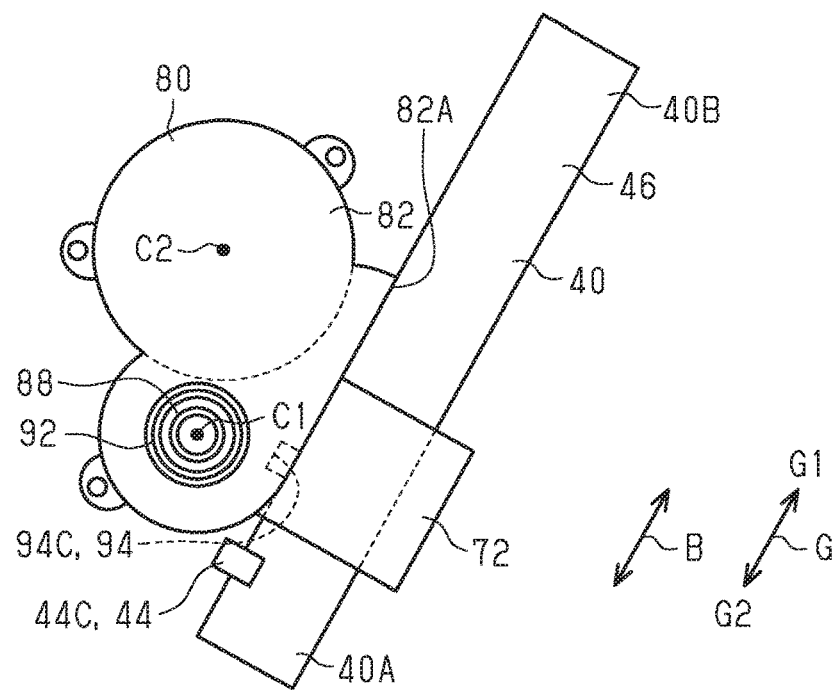
FIG. 21 is a side view of the drive unit shown in FIG. 19 in which the electrical connector is changed to a modified example.
Figure 22:
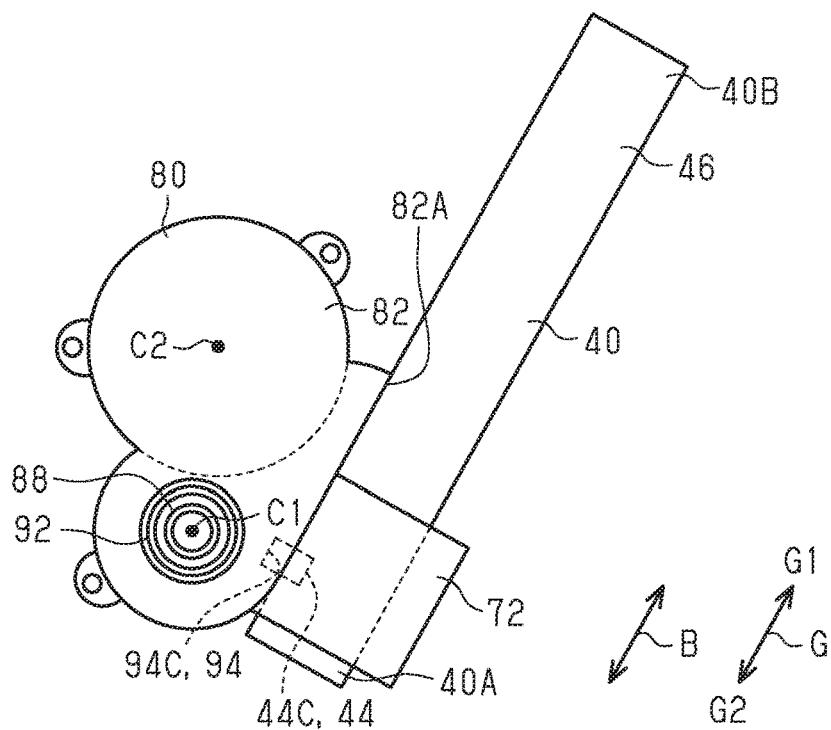
FIG. 22 is a side view of the drive unit shown in FIG. 21 in which the electrical connector is connected to the electrical connector of the battery unit.

As shown in FIGS. 21 and 22, for example, the electrical connector 94 can include the electrical connector 94C, and the electrical connector 44 can include the electrical connector 44C. The electrical connector 94C is configured to be electrically connected to the battery unit 40 in a case in which at least portion of the battery unit 40 is provided in the receptacle 72S. Preferably, in a state in which the battery unit 40 is held by the battery holder 72, the electrical connector 94C is configured to be electrically connected to the battery unit 40. Preferably, a connection terminal of one of the electrical connector 94C and the electrical connector 44C includes a recess, and a connection terminal of the other one of the electrical connector 94C and the electrical connector 44C includes a projection. Preferably, the recess includes two or more recesses. The projection includes, for example, a pogo pin. The electrical connector 44C is provided on a side portion of the battery unit 40. The electrical connector 94C is provided, for example, on the battery holder 72 or a base. In a state in which the battery unit 40 is held by the battery holder 72, the connection terminals of one of the electrical connector 94C and the electrical connector 44C are provided on positions that contact the connection terminals of the other one of the electrical connector 94C and the electrical connector 44C. Thus, in a case in which the battery unit 40 is held by the battery holder 72, the electrical connector 94C and the electrical connector 44C are automatically connected.

Second Embodiment

A second embodiment of the drive unit 80 for the human-powered vehicle and the battery holding device 70 for the human-powered vehicle 10 will now be described with reference to FIGS. 19 to 25. The drive unit 80 and the battery holding device 70 of the second embodiment are the same as the drive unit 80 and the battery holding device 70 of the first embodiment, except for use of a battery holder 102 and the shape of the second restriction 62. The same reference characters are given to those elements that are the same as the corresponding elements of the first embodiment. Such elements will not be described in detail.

The drive system 60 includes a battery holding device 100. The battery holding device 100 includes a battery holder 102 configured to be mounted on the drive unit 80 for the human-powered vehicle 10 provided with the crankshaft 88 at a plurality of positions in the predetermined linear direction. The battery holder 102 is provided on the base 82 and configured to hold the battery unit 40.

The battery holder 102 is configured to hold the first end 40A of the battery unit 40. The battery holder 102 includes a restriction 104 that restricts movement of the battery unit 40 in the predetermined linear direction. The restriction 104 restricts movement of the battery unit 40 in the longitudinal direction F of the frame 16. The restriction 104 is configured to restrict movement of the battery unit 40 in a second direction F2 of the longitudinal direction F of the frame 16. In a state in which the battery unit 40 is held by the battery holder 102, the restriction 104 faces the battery unit 40 in a direction intersecting a direction parallel to the rotational center axis C1 of the crankshaft 88. The restriction 104 includes a surface configured to contact the first end 40A of the battery holder 102. The restriction 104 supports the first end 40A of the battery unit 40 in the longitudinal direction B of the battery unit 40 to restrict movement of the battery unit 40 in the second direction F2.

Preferably, the battery holding device 100 further includes a second restriction 106. The second restriction 106 is configured to hold the second end 40B. The second restriction 106 restricts movement of the battery unit 40 in the predetermined linear direction. The second restriction 106 restricts movement of the battery unit 40 in the longitudinal direction F of the frame 16. The second restriction 106 is configured to restrict movement of the battery unit 40 in at least a first direction F1 of the longitudinal direction F of the frame 16. The second restriction 106 supports the end surface of the battery unit 40 located toward the second end 40B in the longitudinal direction B of the battery unit 40 to restrict movement of the battery unit 40 in the first direction F1. The second restriction 106 is coupled to the frame 16, for example, by bolts or welding.

Figure 23:
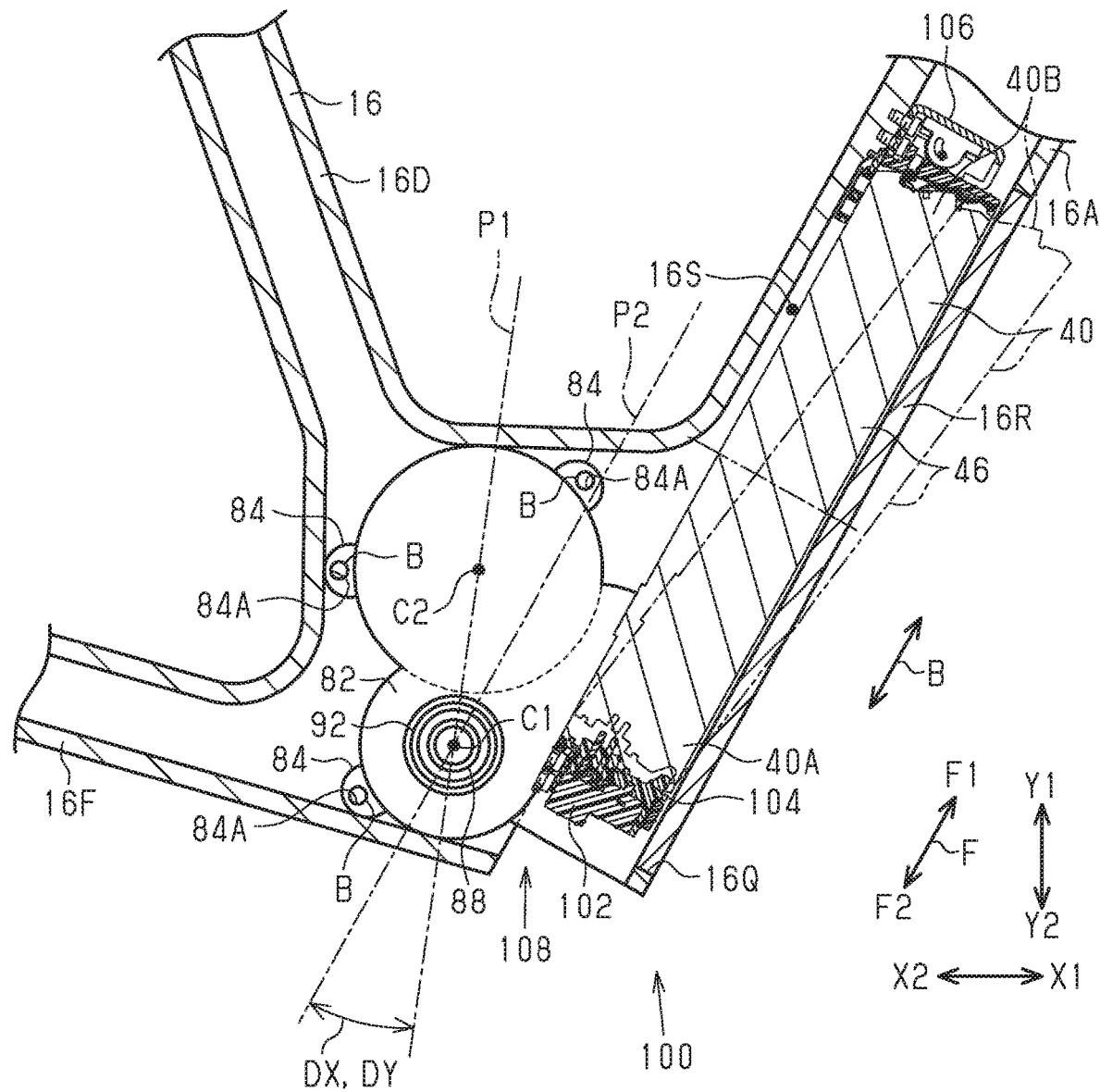
FIG. 23 is a partial cross-sectional view of the frame a human-powered vehicle including a second embodiment of a drive unit for a human-powered vehicle and a battery holding device of a human-powered vehicle.
Figure 24:
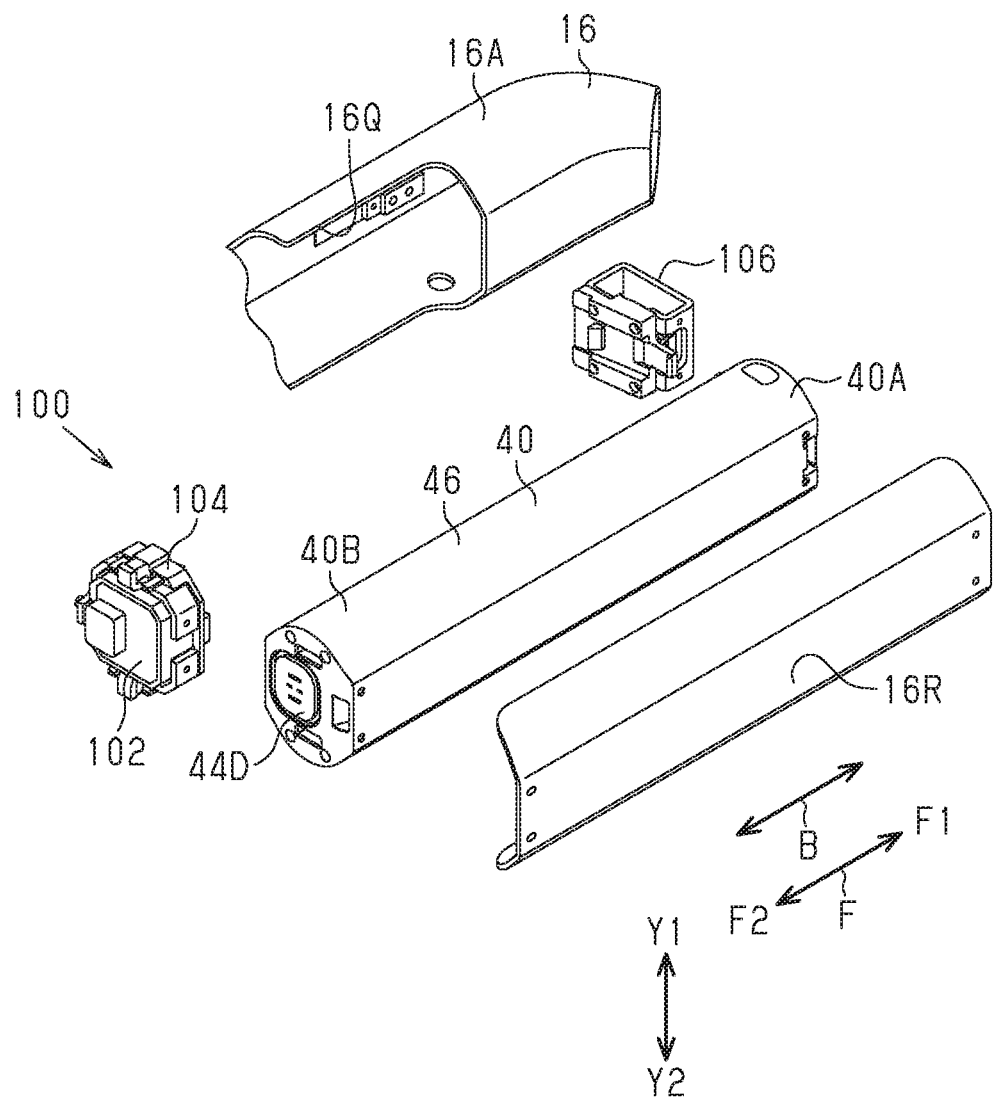
FIG. 24 is an exploded perspective view of the drive unit for the human-powered vehicle shown in FIG. 23, the battery holding device of the human-powered vehicle, and the battery unit.

Preferably, the frame 16 includes an opening 16Q that allows the battery unit 40 to be inserted into the battery receptacle 16S in a direction orthogonal to the longitudinal direction F of the frame 16. A cover 16R is attached to the frame 16 to cover the opening 16Q. The cover 16R is, for example, bolted to the frame 16. The cover 16R can be attached to the battery unit instead of the frame 16. As indicated by the double-dashed lines in FIG. 23, in a state in which the battery holder 102 is in contact with the end surface located toward the first end 40A, the second end 40B is moved toward the battery receptacle 16S so that the battery unit 40 is provided in the battery receptacle 16S. In a state in which the battery unit 40 is held between the battery holder 102 and the second restriction 106, the user can move the second end 40B to an outer side of the battery receptacle 16S as the end surface located toward the first end 40A serves as the rotational center to remove the battery unit 40 from the frame 16. In FIG. 23, the opening 16Q is formed in a lower portion of the frame 16. However, the opening 16Q can be formed in a side surface of the frame.

Preferably, the battery holder 102 includes the electrical connector 94D. The electrical connector 94D is configured to be electrically connected to the electrical connector 44D provided on the end surface of the battery unit 40 located toward the first end 40A. Preferably, one of the electrical connector 94D and the electrical connector 44D includes a projection, and the other one of the electrical connector 94D and the electrical connector 44D includes a recess.

The drive unit 80 includes the base 82 and a holder mount 108. The holder mount 108 is configured to selectively mount the battery holder 102 at a plurality of positions in the predetermined linear direction. Preferably, the drive unit 80 further includes the battery holder 102. Preferably, the predetermined linear direction includes a direction intersecting a direction in which the crankshaft 88 extends. Preferably, the predetermined linear direction is orthogonal to the direction in which the crankshaft 88 extends. Preferably, in a state mounted on the frame 16 of the human-powered vehicle 10, the predetermined linear direction extends in the longitudinal direction F of the frame 16 of the human-powered vehicle 10. Preferably, the predetermined linear direction extends in a direction in which the down tube 16A extends.

Preferably, the holder mount 108 and the frame mount 84 are located at different positions as viewed in a direction in which the crankshaft 88 extends. The holder mount 108 is provided on the flat surface 82. The flat surface includes a surface parallel to the down tube 16A. Preferably, the holder mount 108 is provided in the vicinity of the opening 16P of the frame 16. Preferably, at least part of the frame mount 84 is provided at the upper side Y1 of the human-powered vehicle 10 with respect to the holder mount 108. The battery holder 102 and the frame mount 84 are configured to be mounted on the drive unit 80 at different positions as viewed in a direction in which the crankshaft 88 extends. The battery holder 102 and the frame mount 84 are configured to be mounted on the base 82 of the drive unit 80 at different positions as viewed in a direction in which the crankshaft 88 extends.

Preferably, the holder mount 108 includes at least one of a male thread, a female thread, and an elongated hole that extends in the predetermined linear direction. Preferably, at least part of the holder mount 108 is integral with the base 82 as a one-piece structure. The holder mount 108 is configured to be non-movable in the predetermined linear direction. The holder mount 108 includes a member formed integrally with the base 82 and configured to be non-movable in the predetermined linear direction.

Figure 25:
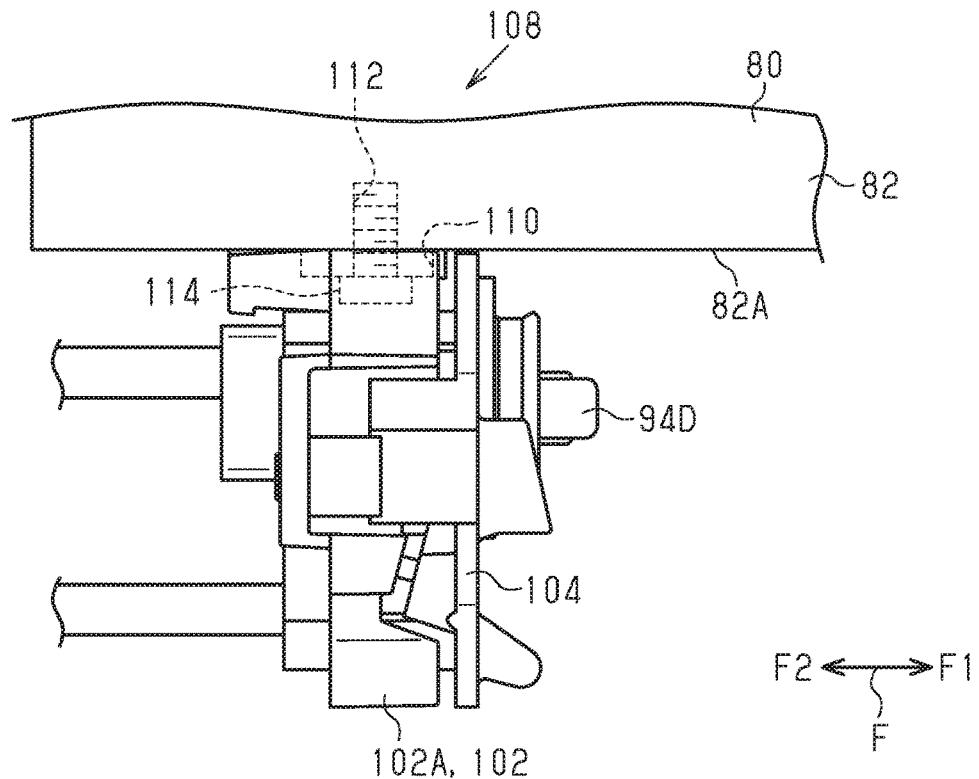
FIG. 25 is a side view showing a first example of a battery holding device of the human-powered vehicle shown in FIG. 23.

FIG. 25 shows a battery holder 102A, which is an example of the battery holder 102. The battery holder 102A includes an elongated hole 110 that extends in the predetermined linear direction. A male threaded fastener 114 having a male thread is inserted into the elongated hole 110 and joined with a threaded hole 112 having a female thread of the drive unit 80. The holder mount 108 includes the elongated hole 110 and the male threaded fastener 114 that is inserted into the elongated hole 110. The elongated hole 110, the threaded hole thread 112 having the female thread, and the male threaded fastener 114 having the male thread constitute the holder mount 108. The threaded hole 112 having the female thread is formed integrally with the base 82. The holder mount 108 is configured to change the portion of the elongated hole 110 into which the male thread 114 is inserted to allow the battery holder 102A to be mounted at a plurality of positions in the predetermined linear direction.

Figure 26:
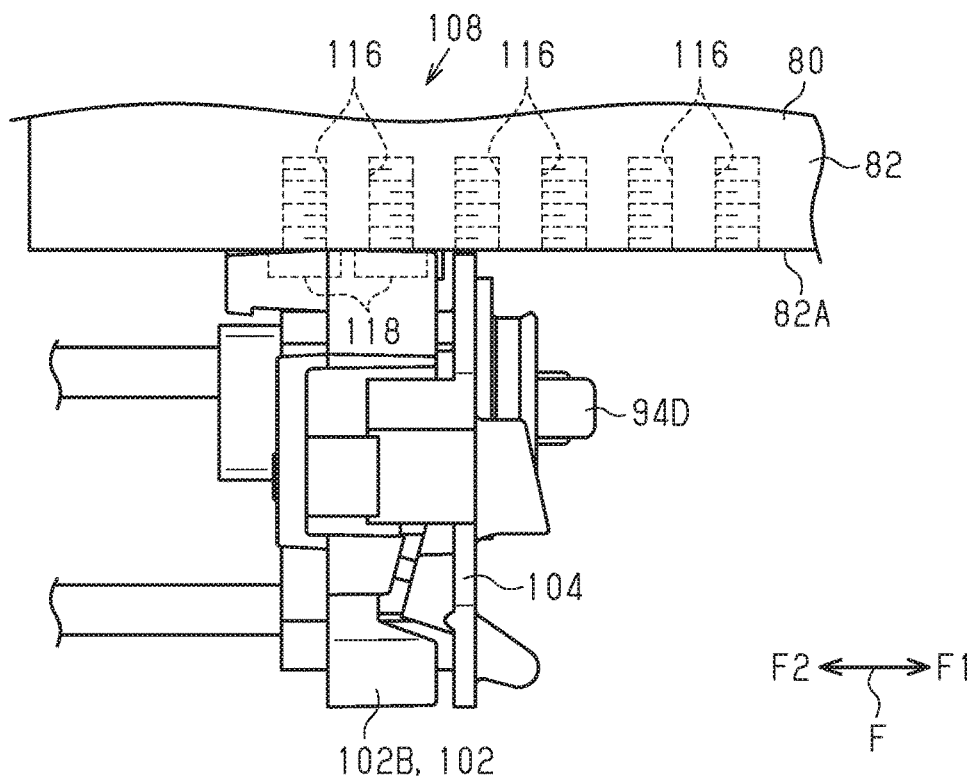
FIG. 26 is a side view showing a second example of a battery holding device of the human-powered vehicle shown in FIG. 23.

FIG. 26 shows a battery holder 102B, which is an example of the battery holder 102. The battery holder 102B includes a male threaded fastener 118 having the male thread joined with one of a plurality of female threaded holes 116 of the drive unit 80 aligned in the predetermined linear direction. The female threaded holes 116 and the male threaded fastener 118 constitute the holder mount 108. The female threaded holes 116 with the female threads are formed integrally with the base 82. The holder mount 108 is configured to change the female threaded holes into which the male threaded fastener 118 is inserted to allow the battery holder 102B to be mounted at a plurality of positions in the predetermined linear direction.

Figure 27:
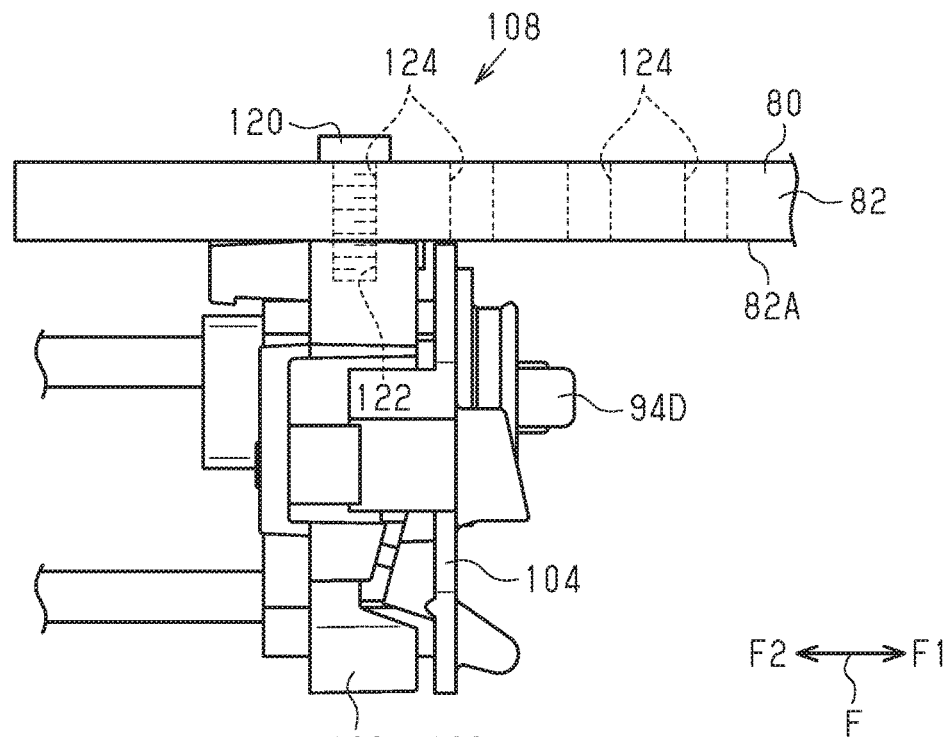
FIG. 27 is a side view showing a third example of a battery holding device of the human-powered vehicle shown in FIG. 23.

FIG. 27 shows a battery holder 102C, which is an example of the battery holder 102. The battery holder 102C includes a female threaded hole 122 joined with a male threaded fastener 120 of the drive unit 80. The base 82 of the drive unit 80 includes a plurality of holes 124 lined in the predetermined linear direction. The male threaded fastener 120, the female thread 122, and the holes 124 configure the holder mount 108. The holes 124 are formed integrally with the base 82. The holder mount 108 is configured to change the hole 124 into which the male threaded fastener 120 is inserted to allow the battery holder 102C to be mounted at a plurality of positions in the predetermined linear direction.

Figure 28:
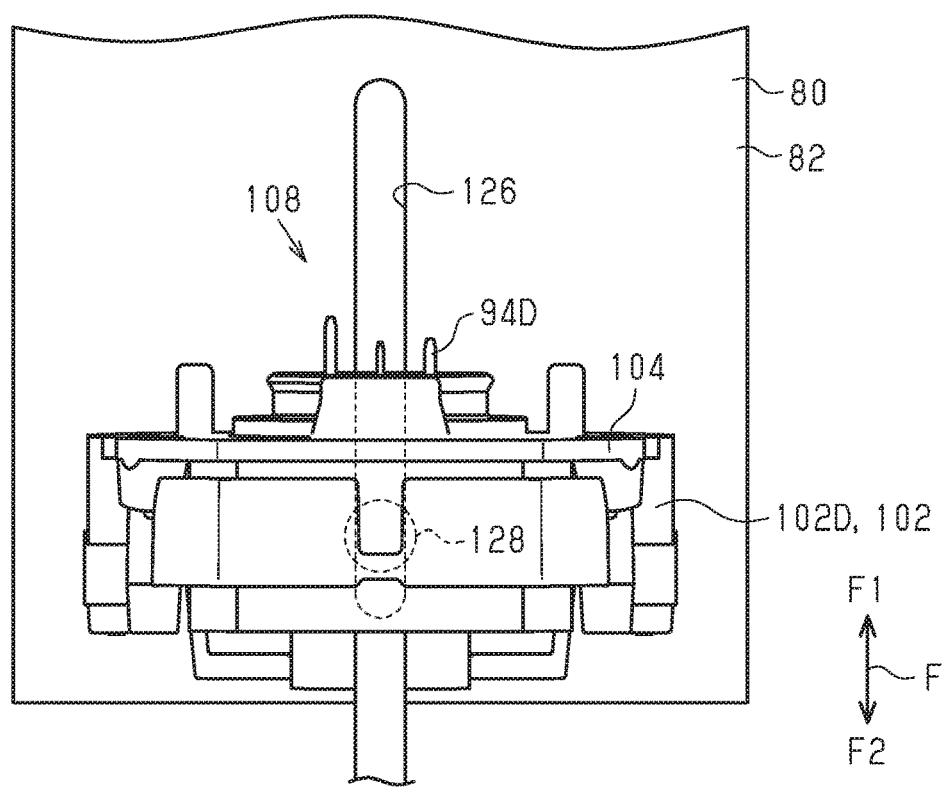
FIG. 28 is a bottom view of the battery holding device of the human-powered vehicle shown in FIG. 27.
Figure 29:
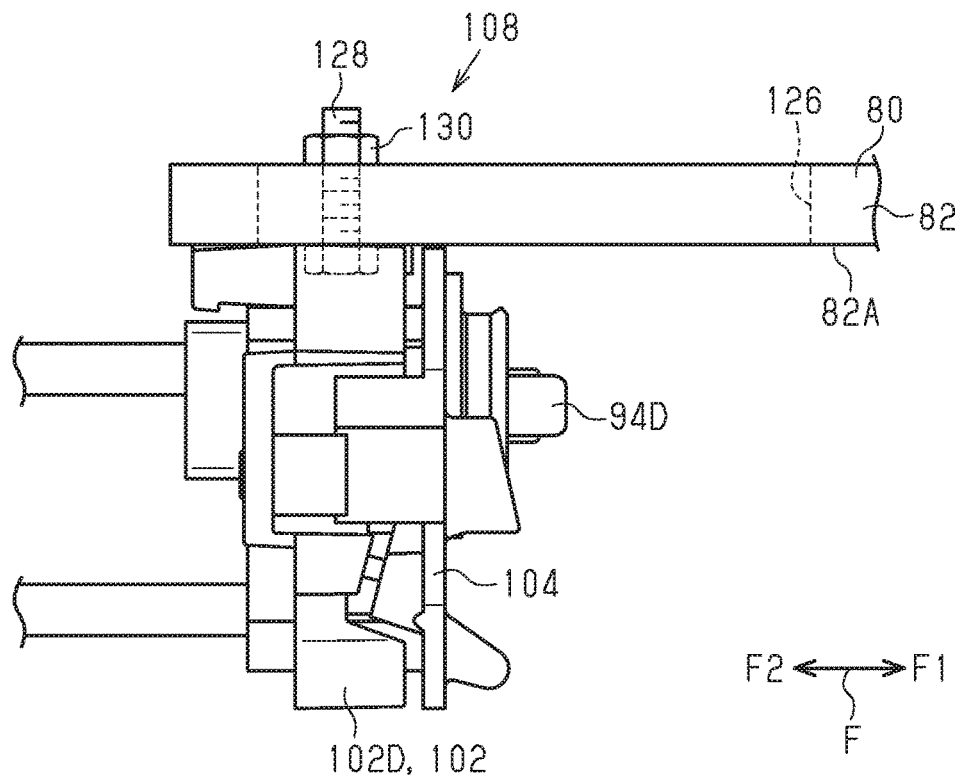
FIG. 29 is a side view showing a fourth example of a battery holding device of the human-powered vehicle shown in FIG. 23.

FIGS. 28 and 29 show a battery holder 102D, which is an example of the battery holder 102. The battery holder 102D includes a male threaded fastener 128 inserted into an elongated hole 126 that extends in the drive unit 80 in the predetermined linear direction. The male threaded fastener 128 is inserted into the elongated hole 126 and coupled to a nut 130. The holder mount 108 includes the elongated hole 126 and the male threaded fastener 128 inserted into the elongated hole 126. The elongated hole 126, the male threaded fastener 128, and the nut 130 configure the holder mount 108. The elongated hole 126 is formed integrally with the base 82. The holder mount 108 is configured to change the portion of the elongated hole 126 into which the male threaded fastener 128 is inserted to allow the battery holder 102D to be mounted at a plurality of positions in the predetermined linear direction.

Modified Examples

The description related to the above embodiments exemplifies, without any intension to limit, applicable forms of a drive unit for a human-powered vehicle and a battery holding device of a human-powered vehicle according to the present disclosure. The drive unit for a human-powered vehicle and the battery holding device of a human-powered vehicle according to the present disclosure can be applied to, for example, modified examples of the embodiments that are described below and combinations of at least two of the modified examples that do not contradict each other. In the following modified examples, the same reference characters are given to those elements that are the same as the corresponding elements of the above embodiment. Such elements will not be described in detail.

Figure 30:
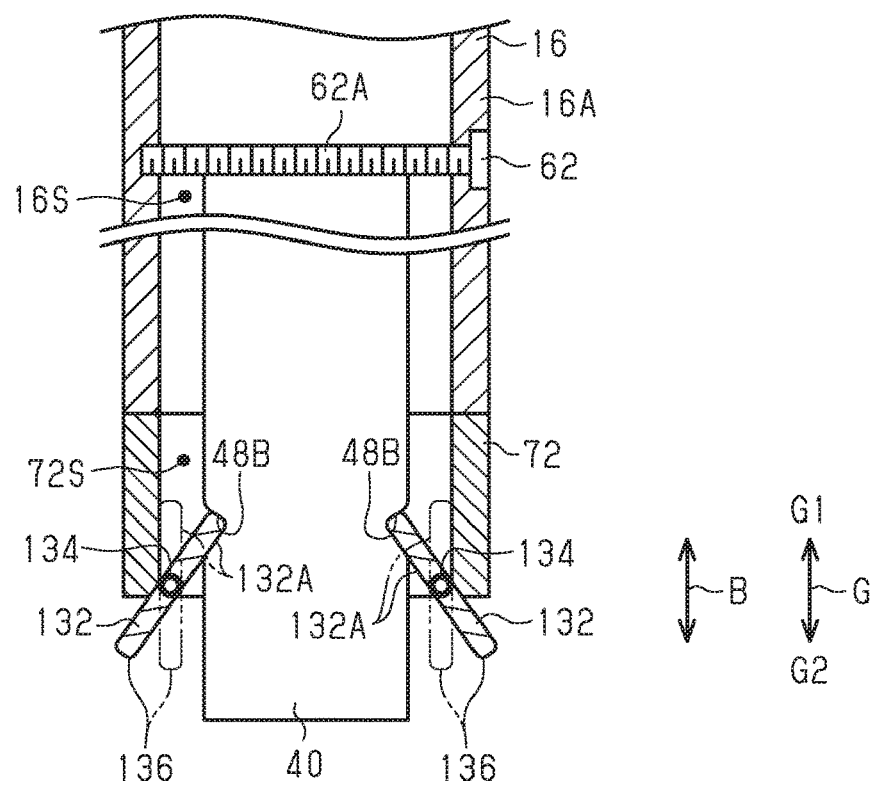
FIG. 30 is a cross-sectional view illustrating a first modified example of the first restriction of the first embodiment.

Each of the first restriction 74A can be changed to a first restriction 132 shown in FIG. 30. The first restrictions 132 are configured to be switched between a first state that restricts movement of the battery unit 40 in the second guide direction G2 and a second state that allows movement of the battery unit 40 in the second guide direction G2. Preferably, each of the first restrictions 132 includes an elastic member 134. Preferably, the drive unit 80 further includes an operating portion 136 operable by the user to switch between the first state and the second state of the first restriction 74A. The operating portion 136 can be provided integrally with the first restriction 132 as a one-piece structure. Each of the first restriction 132 includes a second engagement portion 132A that engages a first engagement portion 48B provided on the battery unit 40. One of the first engagement portion 48B and the second engagement portion 132A includes a projection. The other one of the first engagement portion 48B and the second engagement portion 132A includes a recess. In a state in which the battery unit 40 is held by the battery holder 72, the first restrictions 132 face the battery unit 40 in a direction parallel to the rotational center axis C1 of the crankshaft 88. For example, at least the second engagement portions 132A of the first restrictions 132 are provided on the wall surface of the receptacle 72S of the battery holder 72. The elastic members 134 include, for example, a coil spring. The elastic members 134 bias the second engagement portions 132A toward the battery unit 40 provided in the receptacle 72S of the battery holder 72. The user can operate the operating portions 136 provided on the ends of the first restrictions 132 to separate away the second engagement portions 132A from the battery unit 40.

Figure 31:
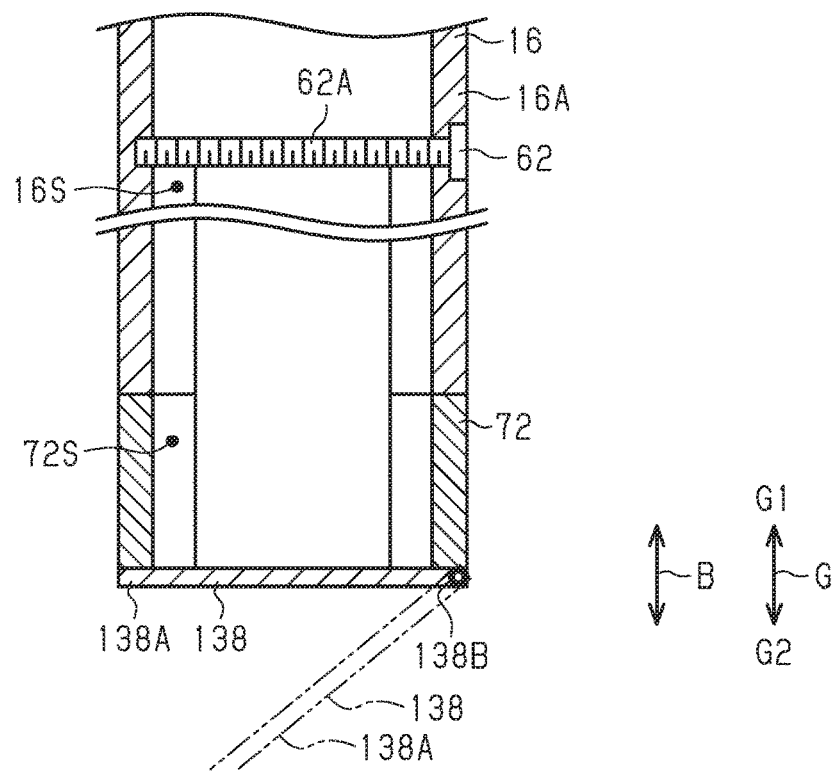
FIG. 31 is a cross-sectional view illustrating a second modified example of the first restriction of the first embodiment.

The first restrictions 74A can be changed to a first restriction 138 shown in FIG. 31. In a state in which the battery unit 40 is held by the battery holder 72, the first restriction 138 faces the battery unit 40 in a direction intersecting a direction parallel to the rotational center axis C1 of the crankshaft 88. The first restriction 138 includes, for example, a plate member 138A that covers the opening located at a lower side Y2 of the receptacle 72S. Preferably, the first restriction 138 includes an elastic member 138B and is biased by the elastic member 138B in a direction covering the lower side Y2 of the receptacle 72S. The elastic member 138B includes, for example, a torsion spring. The first restriction 138 can include a lock mechanism that locks the plate member 138A in a state in which the opening of the lower side Y2 of the receptacle 72S is closed with the plate member 138A.

Figure 32:
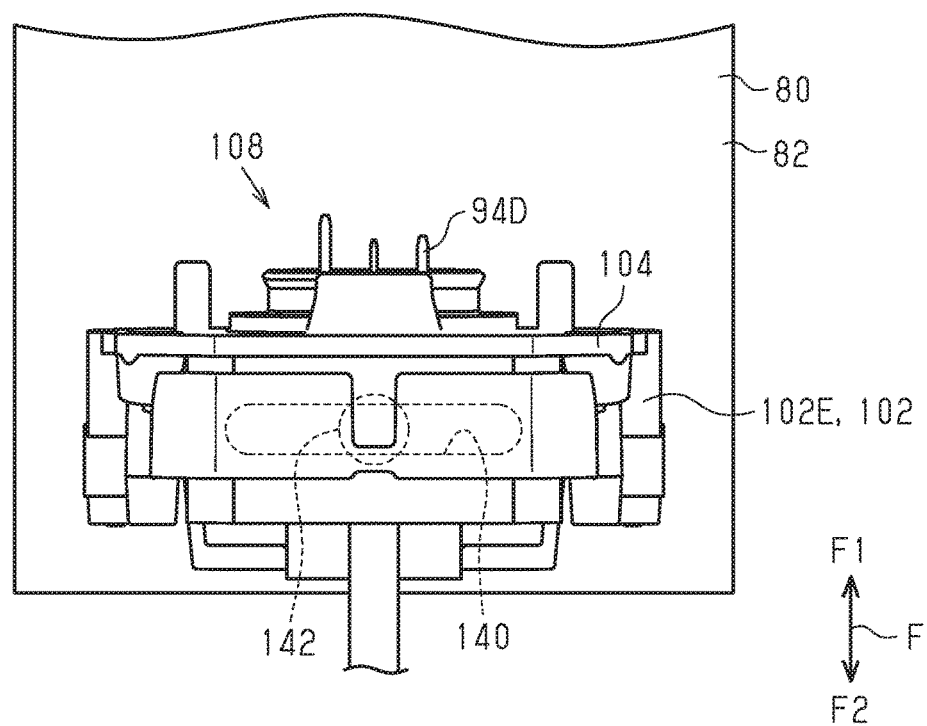
FIG. 32 is a bottom view of a battery holding device of a human-powered vehicle in a modified example of the second embodiment.

The predetermined linear direction can include a direction parallel to a direction in which the crankshaft 88 extends. For example, the holder mount 108 shown in FIG. 32 includes an elongated hole 140 that extends in a direction parallel to a direction in which the crankshaft 88 provided on the battery holder 102E extends, a male threaded fastener 142 inserted into the elongated hole 140, and a female threaded hole of the base 82. The holder mount 108 is configured to change the portion of the elongated hole 140 into which the male threaded fastener 142 is inserted so that the battery holder 102E is configured to be mounted at a plurality of positions in the predetermined linear direction.

In the first embodiment, the guide 86 can be omitted from the drive unit 80. The angle DX can be greater than sixty degrees. The electrical connector 94 can be provided further from the rotational center axis C1 of the crankshaft 88 than the rotational center axis C2 of the motor 90. The battery holder 72 can be provided at the rear side X2 of the human-powered vehicle 10 with respect to the rotational center axis C1 of the crankshaft 88. For example, the drive unit 80 includes the base 82 on which the crankshaft 88 is provided, the frame mount 84 provided on the base 82 and configured to be mounted on the frame 16 of the human-powered vehicle 10, and the battery holder 72 provided on the base 82 and including the receptacle 72S in which at least part of the battery unit 40 extending in the longitudinal direction B is provided. The base 82 can have the crankshaft 88. In a state in which at least part of the battery unit 40 is provided in the receptacle 72S, the receptacle 72S extends through the battery holder 72 in the longitudinal direction B of the battery unit 40.

In the first embodiment, the guide 86 can be omitted from the drive unit 80. The receptacle 72S extending through in the longitudinal direction B of the battery unit 40 can be omitted. The electrical connector 94 can be provided further from the rotational center axis C1 of the crankshaft 88 than the rotational center axis C2 of the motor 90. The battery holder 72 can be provided at the rear side X2 of the human-powered vehicle 10 with respect to the rotational center axis C1 of the crankshaft 88. For example, the drive unit 80 includes the base 82 on which the crankshaft 88 is provided, the frame mount 84 provided on the base 82 and configured to be mounted on the frame 16 of the human-powered vehicle 10, the battery holder 72 provided on the base 82 and including the receptacle 72S in which at least part of the battery unit 40 extending in the longitudinal direction B is provided, and the motor 90 provided on the base 82 and configured to apply a propulsion force to the human-powered vehicle 10. The rotational center axis C2 of the motor 90 is parallel to the rotational center axis C1 of the crankshaft 88. An angle DX formed by the first plane P1 including the rotational center axis C1 of the crankshaft 88 and the rotational center axis C2 of the motor 90 and the second plane P2 including the rotational center axis C1 of the crankshaft 88 and parallel to the longitudinal direction B of the battery unit 40 is greater than or equal to zero degrees and less than or equal to sixty degrees.

In the first embodiment, the guide 86 can be omitted from the drive unit 80. The receptacle 72S extending through in the longitudinal direction B of the battery unit 40 can be omitted. The angle DX can be greater than sixty degrees. The battery holder 72 can be provided at the rear side X2 of the human-powered vehicle 10 with respect to the rotational center axis C1 of the crankshaft 88. For example, the drive unit 80 includes the base 82 on which the crankshaft 88 is provided, the frame mount 84 provided on the base 82 and configured to be mounted on the frame 16 of the human-powered vehicle 10, the battery holder 72 provided on the base 82 and configured to hold the battery unit 40, the motor 90 provided on the base 82 and configured to apply a propulsion force to the human-powered vehicle 10, and the electrical connector 94 configured to electrically connect the battery unit 40 and the motor 90. The electrical connector 94 is provided closer to the rotational center axis C1 of the crankshaft 88 than the rotational center axis C2 of the motor 90.

In the first embodiment, the guide 86 can be omitted from the drive unit 80. The receptacle 72S extending through in the longitudinal direction B of the battery unit 40 can be omitted. The angle DX can be greater than sixty degrees. The electrical connector 94 can be provided further from the rotational center axis C1 of the crankshaft 88 than the rotational center axis C2 of the motor 90. For example, the drive unit 80 includes the base 82 provided on the crankshaft 88, the frame mount 84 provided on the base 82 and configured to be mounted on the frame 16 of the human-powered vehicle 10, the battery holder 72 provided on the base 82 and configured to hold the battery unit 40, and the motor 90 provided on the base 82 and configured to apply a propulsion force to the human-powered vehicle 10. In a state in which the frame mount 84 is mounted on the frame 16 of the human-powered vehicle 10 and all of the wheels 14 of the human-powered vehicle 10 are in contact with a level ground, the rotational center axis C2 of the motor 90 is provided vertically above the rotational center axis C1 of the crankshaft 88 or provided at the upper side Y1 and the front side X1 of the human-powered vehicle 10 with respect to the rotational center axis C1 of the crankshaft 88, and the battery holder 72 is provided at the front side X1 of the human-powered vehicle 10 with respect to the rotational center axis C1 of the crankshaft 88.

The drive unit 80 can be configured so that the battery holders 72 and 102 are not mountable at a plurality of positions in the predetermined linear direction. For example, the drive unit 80 includes the base 82 on which the crankshaft 88 is provided, the holder mounts 98 and 108 provided on the base 82 and configured to be attachable to and detachable from the battery holders 72 and 102, which are configured to hold the battery unit 40, and the frame mount 84 provided on the base 82 and configured to be mounted on the frame 16 of the human-powered vehicle 10. The holder mounts 98 and 108 and the frame mount 84 are located at different positions as viewed in a direction in which the crankshaft 88 extends.

The battery holders 72 and 102 can be omitted from the drive unit 80. A drive unit differs from the drive unit 80 in that the drive unit does not include the battery holders 72 and 102 but otherwise has the same configuration. A battery holder differs from the battery holders 72 and 102 in that the battery holder is not included in the drive unit 80 but otherwise has the same configuration. In this case, in an example, preferably, the battery holding devices 70 and 100 include a battery holder configured to be mounted on the drive unit at a plurality of positions in the predetermined linear direction. In another example, preferably, the battery holding devices 70 and 100 include a battery holder configured to be attachable to and detachable from the drive unit. The battery holder and the frame mount 84 are configured to be mounted on the drive unit at different positions as viewed in a direction in which the crankshaft 88 extends.

Instead of or in addition to the motor 90, the drive unit 80 can include a transmission that changes the transmission ratio of the human-powered vehicle 10. The transmission ratio of the human-powered vehicle 10 is a ratio of rotational speed of the drive wheel 14A to rotational speed of the crankshaft 88.

The battery unit 40 can be mounted on the seat tube 16D or the chainstay 16F. The direction in which the rotational center axis C2 of the motor 90 extends can intersect the direction in which the rotational center axis C1 of the crankshaft 88 extends.

In the first embodiment, the guide 86 can be formed separately from the base 82. For example, the guide 86 can be attached to the base 82, for example, with a fastener member such as a bolt, adhesive, or welding to be integrated with the base 82. In the first embodiment, the guide 86 can be formed separately from the battery holder 72. For example, the guide 86 can be attached to the battery holder 72 with a fastener member such as a bolt, an adhesive, or welding to be integrated with the battery holder 72.

What is claimed is:

1. A drive unit for a human-powered vehicle, the drive unit comprising:
   a base on which a crankshaft is provided; and
   a holder mount provided on the base and configured to selectively mount a battery holder, which is configured to hold a battery unit, at a plurality of positions in a predetermined linear direction.

2. The drive unit according to claim 1, wherein the holder mount includes at least one of a male thread, a female thread, and an elongated hole that extends in the predetermined linear direction.

3. The drive unit according to claim 2, wherein the holder mount includes the elongated hole and a male threaded fastener having the male thread inserted into the elongated hole.

4. The drive unit according to claim 1, further comprising a frame mount provided on the base and configured to be mounted on a frame of the human-powered vehicle, the holder mount and the frame mount being located at different positions as viewed in a direction in which the crankshaft extends.

5. The drive unit according to claim 1, wherein the holder mount is configured to be non-movable in the predetermined linear direction.

6. The drive unit according to claim 1, wherein the base includes a flat surface parallel to the predetermined linear direction, and
   the holder mount is provided on the flat surface.

7. The drive unit according to claim 1, wherein the predetermined linear direction intersects a direction in which the crankshaft extends.

8. The drive unit according to claim 7, wherein the predetermined linear direction is orthogonal to the direction in which the crankshaft extends.

9. The drive unit according to claim 7, wherein the predetermined linear direction extends in a longitudinal direction of a frame of the human-powered vehicle in a state in which the drive unit is mounted on the frame of the human-powered vehicle.

10. The drive unit according to claim 9, wherein the predetermined linear direction extends in a direction in which a down tube of the frame of the human-powered vehicle extends.

11. The drive unit according to claim 1, wherein the predetermined linear direction is parallel to a direction in which the crankshaft extends.

12. The drive unit according to claim 1, wherein at least part of the holder mount is integral with the base as a one-piece structure.

13. The drive unit according to claim 1, wherein the base includes a recess, and
    at least part of the holder mount is provided in the recess.

14. The drive unit according to claim 1, further comprising the battery holder.

15. The drive unit according to claim 14, wherein the battery unit includes a first end and a second end, the second end is spaced from the first end in a longitudinal direction, and
    the battery holder is configured to hold the first end.

16. The drive unit according to claim 14, wherein the battery holder further includes a restriction configured to restrict movement of the battery unit in the predetermined linear direction.

17. The drive unit according to claim 1, further comprising a motor provided on the base and configured to apply a propulsion force to the human-powered vehicle.

18. A drive unit for a human-powered vehicle, the drive unit comprising:
    a base on which a crankshaft is provided;
    a holder mount provided on the base and configured to be attachable to and detachable from a battery holder, the battery holder being configured to hold a battery unit, the holder mount and the battery holder being disposed farther toward a front of the human-powered vehicle than the crankshaft is when the drive unit is installed on the human-powered vehicle; and
    a frame mount provided on the base and configured to be mounted on a frame of the human-powered vehicle, the holder mount and the frame mount being located at different positions as viewed in a direction in which the crankshaft extends.

19. The drive unit according to claim 18, wherein the holder mount includes at least one of a male thread, a female thread, and an elongated hole.

20. The drive unit according to claim 18, wherein
the holder mount is configured to selectively mount the battery holder at a plurality of positions in a predetermined linear direction.

21. A battery holding device configured to hold a battery unit of a human-powered vehicle, the battery holding device comprising:
a battery holder configured to be mounted at a plurality of positions in a predetermined linear direction on a drive unit of the human-powered vehicle provided with a crankshaft.

22. The battery holding device according to claim 21, wherein
the battery holder includes a restriction configured to restrict movement of the battery unit in the predetermined linear direction.

23. The battery holding device according to claim 21, wherein
the battery holder includes an elongated hole extending in the predetermined linear direction and a male threaded fastener having a male thread inserted into the elongated hole and joined with a female thread of a threaded hole of the drive unit.

24. The battery holding device according to claim 21, wherein
the battery unit includes a first end and a second end in a longitudinal direction, and
the battery holder is configured to hold the first end.

25. A battery holding device configured to hold a battery unit of a human-powered vehicle, the battery holding device comprising:
a battery holder configured to be attachable to and detachable from a holder mount of a drive unit of the human-powered vehicle, the drive unit further including a frame mount and a crankshaft the frame mount being configured to be mounted on a frame of the human-powered vehicle,
the holder mount of the drive unit being located at a different position from the frame mount as viewed in a direction in which the crankshaft extends, the battery holder being disposed farther toward a front of the human-powered vehicle than the crankshaft is when the drive unit is installed on the human-powered vehicle and the battery holder is attached to the drive unit.

26. The battery holding device according to claim 25, wherein
the battery holder is configured to be selectively mounted on the drive unit, which is provided with the crankshaft, at a plurality of positions in a predetermined linear direction.

27. The battery holding device according to claim 25, wherein
the battery holder includes two contact portions configured to contact two ends of the drive unit at positions corresponding to the holder mount, the two ends facing outwardly along directions parallel to the direction in which the crankshaft extends.

* * * * *